United States Patent
Kreiner et al.

(10) Patent No.: US 8,542,729 B2
(45) Date of Patent: Sep. 24, 2013

(54) MEDIA CODEC DEVICES PROVIDING UNIVERSALITY FOR ENCODED SIGNAL ORIGINATION AND DECIDED SIGNAL DISTRIBUTION

(75) Inventors: Barrett Kreiner, Woodstock, GA (US); Ryan Schaub, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/475,639

(22) Filed: May 18, 2012

(65) Prior Publication Data

US 2012/0230435 A1   Sep. 13, 2012

Related U.S. Application Data

(63) Continuation of application No. 12/257,094, filed on Oct. 23, 2008, now Pat. No. 8,208,534.

(51) Int. Cl.
*H04N 7/167* (2011.01)

(52) U.S. Cl.
USPC .............. 375/240.01; 375/240.25; 380/240; 725/31

(58) Field of Classification Search
USPC .................. 375/240.25, 240.01; 380/240
See application file for complete search history.

(56) References Cited

U.S. PATENT DOCUMENTS

| | | | |
|---|---|---|---|
| 6,061,451 A | | 5/2000 | Muratani et al. |
| 6,408,351 B1 * | | 6/2002 | Hamdi et al. .................. 710/63 |
| 7,797,552 B2 | | 9/2010 | Kahn et al. |
| 2002/0116708 A1 * | | 8/2002 | Morris et al. .................. 725/37 |
| 2003/0206631 A1 * | | 11/2003 | Candelore .................... 380/210 |
| 2008/0120675 A1 * | | 5/2008 | Morad et al. .................. 725/120 |
| 2008/0120676 A1 * | | 5/2008 | Morad et al. .................. 725/127 |
| 2008/0137848 A1 * | | 6/2008 | Kocher et al. ................ 380/201 |
| 2010/0104002 A1 | | 4/2010 | Kreiner et al. |

OTHER PUBLICATIONS

"Scalable Content Delivery Over P2P Convergent Networks," Zahariadis et al., IEEE International symposium, pp. 1-4, 2008.
"How Satellite TV Works," date unknown, http://electronics.howstuffworks.com/satellite-tv.htm, 2009.
"Apple TV," Oct. 22, 2008, http://en.wikipedia.org/wiki/Apple_TV.
"TiVo HD DVR," data unknown, https://www3.tivo.com/store/boxdetails.do?boxName=180hourtivohd&boxsku=R65216, 2008.
"Connecting to the Remote TVs' Dish Vip722DVR," Connections and Setup, Chapter 12, pp. 103-107, Dish Network, http://www.dishnetwork.com/content/our_products/user_guides_an, 2011.
"ViP722DVR," date unknown, Dish Network, 2011.

(Continued)

*Primary Examiner* — Matthew Smithers
(74) *Attorney, Agent, or Firm* — Akerman Senterfitt; Michael K. Dixon; Roy Zachariah

(57) ABSTRACT

A media codec device includes an input port that receives media signals from service providers and also receives power for the media codec device, and a decoder that stores decoder keys associated with the service providers. The decoder applies the decoder keys to decode the media signals. The media codec device operates to direct at a first time a decoded first media signal to a first output device and a decoded second media signal to a second output device, and to direct at a second time the decoded first media signal to the second output device and the decoded second media signal to the first output device.

17 Claims, 20 Drawing Sheets

(56) References Cited

OTHER PUBLICATIONS

"Using DishONLINE," Dish Network pp. 12-16, date unknown http://www.dishnetwork.com/content/whats_on_dish/dish_on_demand./dishonline/index.shtml, 2011.

"Windows Media Center: TV Tuners and Remotes," Microsoft, date unknown http://www.microsoft.com/windows/products/winfamily/mediacenter/getstarted/tuners-remotes.mspx, 2008.

"Sonos Multi-Room Music System," date unknown, http://www.sonos.com/howitworks/, 2008.

"Powerful Components Make the ZV System Work," ZeeVee, Inc., date unknown, http://www.zeevee.com/products, 2009.

* cited by examiner

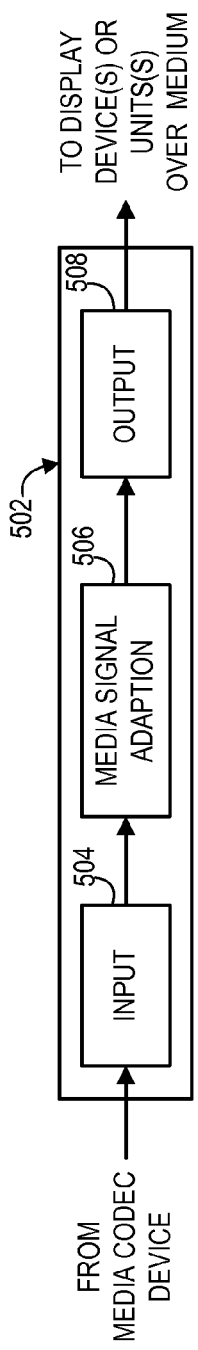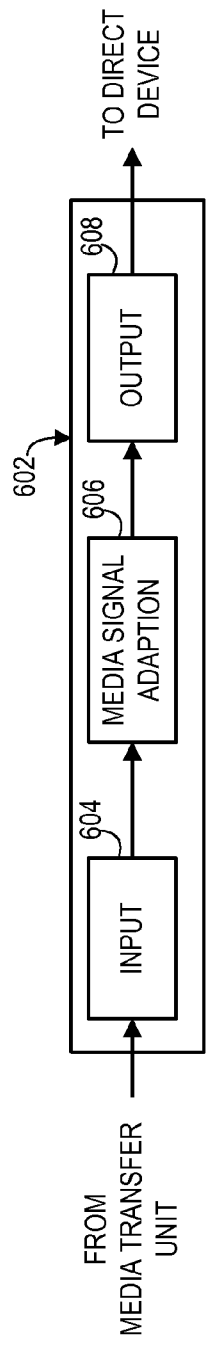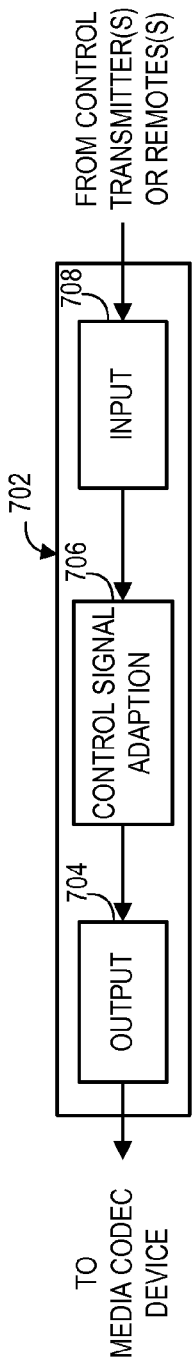

DECODER MAPPING

| SERVICE PROVIDER | AVAILABLE CHANNELS | DECODER KEYS |
|---|---|---|
| A | 1 | <1A> |
|   | 2 | <1A> |
|   | . | . |
|   | . | . |
|   | . | . |
|   | 20 | <1A> |
| B | 1 | <1B> |
|   | 2 | <2B> |
|   | . | . |
|   | . | . |
|   | . | . |
|   | 10 | <10B> |
| C | 35 | <35C> |
|   | . | . |
|   | 40 | <40C> |
|   | . | . |
|   | . | . |
|   | 50 | . |
| LOCAL-1 | 1 | <1L-1> |

FIG. 16

OUTPUT MODIFICATION MAPPING

| OUTPUTS 2302 | STRETCH 2304 | SCALE 2306 | MIX 2308 |
|---|---|---|---|
| 1 – 1.1 | NO | 1080p | NO |
| 1 – 1.2 | YES | 720p | NO |
| 2 – 2.1 | NO | NATIVE | YES |
| 2 – 2 | NO | 480i | NO |
| 3 – 1.1 | YES | NATIVE | NO |
| 3 – 2.1 | NO | 480p | NO |
| 4 – | NO | NATIVE | NO |

FIG. 23

MEDIA CODEC DEVICES PROVIDING UNIVERSALITY FOR ENCODED SIGNAL ORIGINATION AND DECIDED SIGNAL DISTRIBUTION

CROSS REFERENCE TO RELATED APPLICATIONS

This application is a continuation of U.S. patent application Ser. No. 12/257,094, entitled "Media Codec Devices Providing Universality for Encoded Signal Origination and Decided Signal Distribution," filed on Oct. 23, 2008, the disclosure of which is hereby expressly incorporated by reference in its entirety.

FIELD OF THE DISCLOSURE

Embodiments are related to the provisioning of digital media services. More particularly, embodiments are related to providing for universal signal origination and universal signal distribution.

BACKGROUND

The digital distribution of media signals such as media streams over the Internet is becoming commonplace. Audio and video streams are widely available on the Internet from many different sources. The audio and video streams are typically encoded in a standard format, such as Motion Picture Experts Group (MPEG) standards MPEG-2 and MPEG-4. Such encoding provides various benefits such as to compress the amount of data that is included in the stream to provide an adequate playback quality at the user device. The user device decodes the incoming streams by applying a codec available to the user device.

The encoding and decoding process may involve encryption of the encoded data such that the decoding process may occur only if a decoder key and a corresponding decryption algorithm are available at the end user device. Thus, merely having the appropriate codec does not grant automatic access to the media stream content. Typically, a subscription to a service provider allows for possession of the appropriate decoder key and decryption algorithm for media streams for that service provider. Service providers are cautious regarding distribution of such decoder keys and decryption algorithms so as to protect against unlawful access to the media content.

In some cases, a service provider may take a relatively relaxed approach to distribution of content. Here, the service provider may allow a user's computer device to employ software based decoding where the decoder key and decryption algorithm and in some cases even the codecs themselves are compiled into a software package that the user may load onto the user's computer under a single machine license. The software may require an activation which may render the software as nonfunctional on any other computer to prevent multiple users from benefitting from the same software package license. That software package must be present and must be used when viewing content sourced from that corresponding service provider. If media content from multiple service providers that protect their media is desired, then multiple software packages must be present in such cases.

In other cases, a service provider may take a stricter approach to distribution of content. Here, the service provider may require one or more service provider specific devices or hardware items, such as a set top box, that includes hardware based codecs, decryption algorithms, and decoder keys. Without such hardware, the media streams are unavailable, and such hardware may cost a significant amount. Furthermore, as codecs, decryption algorithms, decoder keys, device connectivity, and other technologically related aspects of obtaining the media content change, the hardware may become obsolete and require recurring replacement.

In addition to the issues with obtaining media streams from service providers who protect their media content, distributing the media to a desirable place to enjoy it within the user premise also raises issues. While the downloaded media streams may be enjoyable in some cases on the user's download device, such as a computer, the user may prefer to enjoy such audio and video streams on other playback devices including a regular television or a large screen home theater system. While there are some existing systems that may assist the user in distributing the media stream from a computer to another playback device such as a television or large screen home theater, such existing systems have many drawbacks. For instance, a local data network may be used to transmit the media and simultaneous network usage and inherent limitations on bandwidth of the local data network may cause issues with media delivery. Such problems are further magnified where notoriously unreliable wireless local networking is employed.

Additional issues arise when considering the portability of obtaining such media streams and delivering them to desirable places for playback. In some instances, the device used to obtain and decode the media streams is tied to a given physical location and may not function elsewhere. In other instances, the device to obtain and decode a media stream may function at different physical locations, but the device itself may be installed within an infrastructure for receiving signals and/or for distributing them at the premise. This infrastructure, such as connectivity to data networking components or connectivity to downstream playback components via a variety of cables makes attempting to physically transfer the device an overly burdensome chore.

As can be seen from the non-exhaustive set of factors discussed above, there are many issues associated with obtaining digital media content. Likewise, there are many issues associated with locally distributing digital media content for playback.

SUMMARY

Embodiments disclosed herein address issues such as these and others by providing a more universal approach to obtaining digital media content. Embodiments disclosed herein also address issues such as these and others by providing a more universal approach to distributing such digital media content once it has been obtained.

Embodiments include methods of providing media services. The methods involve receiving and storing at least one decoder key for each service provider providing media signals to a media codec device within a modifiable memory of a hardware based decoder of the media codec device. The method further involves receiving protected media signals at the media codec device from at least one service provider. Each of the received protected media signals is decoded at the media codec device using the at least one hardware based decoder and the at least one decoder key applicable to the protected media signal.

Embodiments include computer readable media that contain instructions for providing media services. The instructions when implemented at a media codec device result in acts such as receiving and storing at least one decoder key for each service provider providing media signals to the media codec device within a modifiable memory of a hardware based decoder of the media codec device. The acts may further include receiving protected media signals at the media codec device from at least one service provider and decoding each of the received protected media signals at the media codec device using the at least one hardware based decoder and the at least one decoder key applicable to the protected media signal.

Embodiments provide a media codec device that includes at least one input port that receives protected and encoded media signals from a plurality of service providers. The media codec device further includes a hardware based decoder supporting a plurality of codecs and including a modifiable memory that stores at least one decoder key for each service provider, the hardware based decoder applying the corresponding decoder key to each media signal to be decoded. The media codec device further includes at least one output port that outputs the decoded media signal.

Embodiments include a method of providing media services that involves receiving media signals at a media codec device from at least a first and a second service provider, the media codec device including at least one hardware based decoder applicable to the media signals from the first and the second service providers. The method further involves decoding each of the received media signals at the media codec device using the at least one hardware based decoder and determining within the media codec device which output of the media codec device to direct the decoded media signals of the first and second service providers. The method further involves at a first point in time and based on determining where to direct the decoded media signals, directing the decoded media signal from the first service provider to a first output of the media codec device while directing the decoded media signal from the second service provider to a second output of the media codec device. Additionally, the method involves at a second point in time and based on determining where to direct the decoded media signals, directing the decoded media signal from the first service provider to the second output of the media codec device while directing the decoded media signal from the second service provider to the first output of the media codec device.

Embodiments include a method of delivering media that involves receiving a control signal from a remote control that selects a media signal and that identifies a carrier channel corresponding to the remote control. The method further involves injecting the control signal onto a distribution medium and receiving the control signal from the distribution medium. The method further involves obtaining the selected media signal at a media codec device based upon receiving the control signal from the distribution medium. Additionally, the method involves decoding the obtained media to produce a decoded media signal at the media codec device and injecting the decoded media signal onto the identified carrier channel of the distribution medium.

Embodiments include a media codec system for providing media services. The media codec system includes a media codec device having an input that receives media signals from at least one service provider, the media codec device including at least one hardware based decoder applicable to the media signals to decode each of the received protected media signals and wherein the media codec device outputs each decoded media signal. The media codec system further includes a first housing establishing a user-separable physical connection to the media codec device. The media codec system also includes at least one media transfer unit establishing a physical connection to the first housing and establishing a separable electrical connection to the media codec device that separates upon separation of the media codec device from the physical connection to the first housing. The at least one media transfer unit has an input that receives the decoded media signal from the media codec device via the electrical connection and an output that distributes the decoded media signal to a first display device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

FIG. 5 shows components of one example of a media transfer unit.

FIG. 6 shows components of one example of a media display unit.

FIG. 7 shows components of one example of a control receiver unit.

FIG. 16 shows one example of a mapping of media signal origins within a memory of a decoder of an illustrative media codec device.

FIG. 23 shows one example of a mapping of a current media signal manipulation scheme within a memory of an illustrative media codec device or within a memory of an illustrative media transfer unit or media display unit.

DETAILED DESCRIPTION

Embodiments provide for obtaining media signals, decoding them, and distributing them for playback to users. Certain embodiments provide for obtaining media signals from a variety of sources, including protected media signals from a variety of sources, decoding them and distributing them. Certain embodiments provide for the distribution of decoded media signals being received simultaneously to corresponding display devices where such media signals have been requested. Certain embodiments provide for distribution mediums being used for media signal delivery while also being used to deliver control signals pertinent to the media signal being delivered. Certain embodiments further provide for the portability of media services from one physical location to another.

Figure 1:
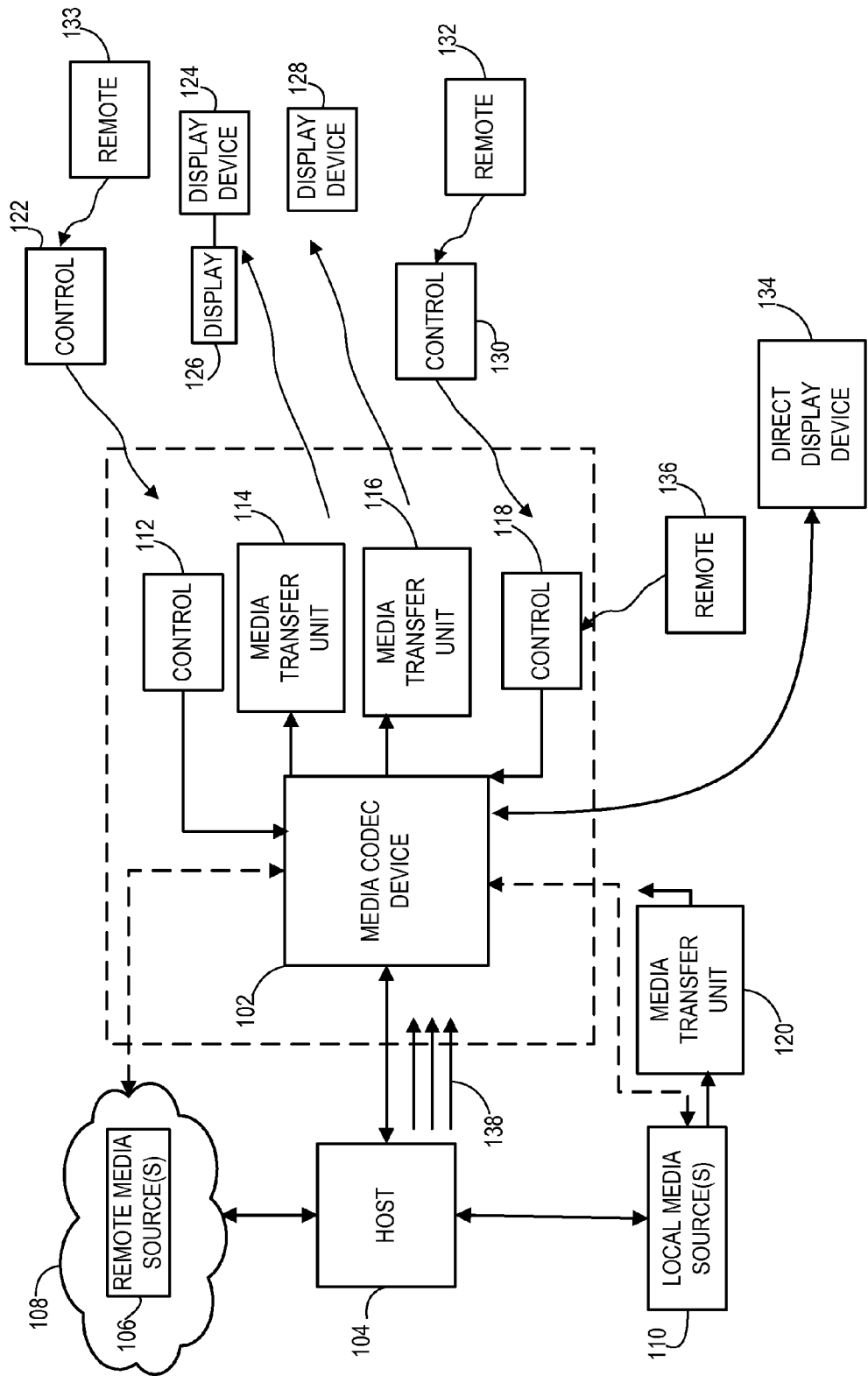
FIG. 1 shows an example of an operating environment for various embodiments of media codec devices.

FIG. 1 shows an environment in which one or more of such embodiments may be present. Several devices are shown in FIG. 1 and may reside at the physical premise of a given user. At this user premise, there may be a media codec device 102 that is responsible for obtaining media signals and controlling the distribution of the media signals to the various playback devices within the user premise.

According to various embodiments, the media codec device 102, which is discussed in more detail below with reference to FIGS. 2-4, may be present as a device that consolidates much of the media services that a user may wish to obtain for the premise by being decoupled from the service provider or other origination of the media signals and hence be a universal decoding device. For instance, the media codec device 102 may have the capability to decode media signals from any number of service providers rather than being specific to a single service provider. As discussed below, the media codec device 102 may maintain a collection of codecs, decryption algorithms, and decoder keys as may be needed to obtain and decode media services from any number of service providers that the user may wish to access.

By decoupling the media codec device 102 from the sources of the media signals, the user gains the benefit of not having to install software for each service provider on a computer and does not have to invest in service provider specific hardware. Thus, the user is provided with a sense of freedom in terms of obtaining media services from whatever service providers allow for media codec devices, such as the media codec device 102, to decode their media signals and in terms of switching service providers without the need to return hardware or have hardware that has been purchased but is no longer in use.

According to various embodiments, the media codec device 102 may further consolidate distribution of media services such that the one media codec device may handle distributing the media signals to many if not all of the playback devices within the user premise. The media codec device 102 may accomplish such consolidated distribution by handling multiple media streams simultaneously. Furthermore, the media codec device 102 may accomplish the consolidated distribution by being physically decoupled from the distribution medium used for any particular media signal being delivered. For instance, one television may utilize a coaxial cable to receive its media signals on a television channel, while another television may utilize an over the air localcast to receive its media signals on a television channel, while yet another television may utilize a direct digital connection to receive its media signals. The media codec device 102, by being decoupled from such distribution mediums, may distribute the media signals to standardized output connections such that add-on devices referred to herein as media transfer units may then couple to the available distribution mediums without requiring the media codec device 102 to manage such delivery.

By decoupling the media codec device 102 from the distribution mediums used to deliver the media signals to the playback devices, the media codec device 102 is given a degree of future-proofing while also gaining the ability to work with whatever distribution infrastructures may already be present at the user premise. For instance, the user premise may be wired with coaxial cable already, and the media codec device 102 outputs media signals that can be injected onto the coaxial cable. Should the same or another media codec device 102 be placed into a user premise that lacks coaxial cabling, or if a playback device is located out of reach of the coaxial cabling, then the media codec device's 102 output may additionally or instead be localcasted over the air. Should a technological advancement bring about yet another distribution medium, such as fiber optic lines in the premise, then the media codec device's 102 output may injected onto the fiber optic lines for delivery to the playback devices.

Thus, the media codec device 102 may be a long-lasting hardware investment by the user. The media codec device 102 may remain as a source of media services within the premise during switches or additions of service providers, and also during changes to the mechanisms for delivering media signals to playback devices. In some embodiments, the media codec device 102 may provide such decoupling in a manner that also facilitates the transporting of the media services provided by the media codec device 102 from one physical location to another, such that the user may wish to keep the same access to media services regardless of whether at home, at a second home, on vacation, and so forth.

Returning to FIG. 1, in this example, the media codec device 102 may be connected to a host device 104. The host device 104 may be of various forms such as a personal computer, a server computer, a network gateway, and the like. The host device 104 may provide data connectivity and/or power to the media codec device 102. For instance, the media codec device 102 may utilize a standardized connection such as a universal serial bus (USB) connection to the host 104 where the USB connection provides operating power from the host 104 to the media codec device 102 and also provides high-speed data connectivity for obtaining multiple encoded media signals from one or more sources.

In some alternative embodiments, the media codec device 102 may include its own networking capabilities to directly interface to a local or wide area network using network protocols such as transport control protocol, internet protocol, Ethernet, and the like and may also have its own dedicated power connections. Such alternative networking capabilities are illustrated by the broken lines leading to remote network sources 106 of media content on a wide area network 108 such as the Internet and/or local media sources 110 on a local area network at the user premise.

The remote media sources 106 may include sources on the data networks 108 such as Internet based resources for streaming audio and/or video. Such sources 106 of media may provide encoded media signals 138 either as a free service or under a subscription where the encoded media may use encryption protection. Data network delivery of the encoded media signals 138 is becoming commonplace not only for traditional Internet based service providers but also for cable and satellite television providers who also may offer their content over such data network connections. Furthermore, the remote media sources 106 may be cable, satellite, or other providers using other wide area distribution techniques. For instance, the host 104 may interface to the upstream cable network, to a satellite dish, or to other proprietary mediums to obtain carrier signals, extract the encoded media signals 138 from the carrier signals, and pass the encoded media signals 138 through to the media codec device 102.

The local media sources 110 may include various devices on the user premise, such as local digital video recorders, handheld video cameras, security cameras, and the like. The encoded media signals 138 being produced by these sources 110 of media content may be available through the host 104, or in the alternative through a direct connection to the media codec device 102, just as the encoded media signals originating from service providers who operate the remote sources 106.

The media codec device 102 receives a request from a user within the user premise to obtain a particular media signal. This request may be provided to the media codec device 102 by the user entering commands on a remote control 132, 133, and 136. These commands are then provided to the media codec device 102 in one of several ways.

In the case of the remote controls 132, 133 that have a short range, such as infrared remote signals, the media codec device 102 and any control receiving units 112, 118 connected to the media codec device may be located distantly from the location within the user premise where the users and the remotes 132, 133, and 136 are located. The short range command signals do not travel to the location of the media codec device 102, so these command signals may instead be picked up by control transmitting units 122, 130. These control transmitting units 122, 130 are nearby the playback devices such as display devices 124, 128 being viewed by the users operating the remote controls 132, 133. These control transmitting units 122, 130 are also in range of the remotes 132, 133 and receive the command signals of the remotes 132, 133, respectively.

The control transmitting units 122, 130 then send the command signal, albeit in a different format than the original short-range format, to the control receiver unit 112, 118. The control transmitting units 122, 130 may utilize a relatively long-range wireless transmission such as a radio frequency carrier. As another example, the control transmitting units 122, 130 may utilize a reverse-direction coax injection with an out-of-band carrier or on an unused in-band carrier. Such implementations are discussed below in more detail.

In some cases, the remote 136 may already be a long range capable remote, such as utilizing a radio frequency transmission, or may already be in close proximity to the media codec device 102 and the control receiving unit 118 connected thereto. In either case, the remote 136 may communicate directly with the control receiving unit 118 rather than relying upon the control transmitting unit 122, 130.

The control receiving units 112, 118 receive the command signals and then convert the command signals to control data that is provided to an input port of the media codec device 102. In one example, the media codec device 102 may be provided with logic to recognize control data of a variety of conventions so as to be responsive to control data that may be of different varieties. For instance, the control data produced by the remote 133 to switch to a new media signal may be different control data than that produced by the remote 132. In another example, the control receiving units 112, 118 may perform a standardization of control data by having logic to convert control data from any of the remotes 132, 133, and 136 to control data that is recognized by the media codec device 102.

Upon receiving control data, the media codec device 102 accesses the appropriate source as specified by the request. For instance, the availability of media signals may be offered in terms of a list that may be generated for display by the media codec device 102, where the user may use the arrow and select keys of a remote, channel up/down buttons of the remote, and so forth to make selections from the list of available media signals. The key selections on the remote, based on knowledge of where the pointer is in the list of available media signals, provides the media codec device 102 with the information necessary to determine which media signal has been selected. Furthermore, for embodiments where multiple sources are available, the information further indicates which source provides the media signal being requested such that the media codec device 102 can generate an upstream request for that media signal from the appropriate source, such as from a particular service provider.

Upon obtaining the requested media signal from the appropriate source, the media codec device 102 may further act upon the control data to provide the requested media signal to the playback device 124, 128, or a playback device 134 that corresponds to the remote 133, 132, or 136 that sent the request. As is discussed in detail below, the media codec device 102 may maintain awareness of the relationship of the remotes 133, 132, and 136 to media signal outputs of the media codec device 102 so that the correct output is chosen for a given media signal.

The requested media signals that have been obtained by the media codec device 102 are decoded prior to distribution. The decoding process involves applying a proper codec to the encoded media signal to achieve the data of the original media signal prior to encoding. The negotiation between the media codec device 102 and the source 106, 110 may inform the media codec device 102 of the proper codec to employ or to the extent the given source 106, 110 employs the same encoding for all media signals, then the proper codec may be mapped in memory of the media codec device 102 for that source. Furthermore, the media signal itself may identify the proper codec such as by using unencoded headers that contain such information.

For protected media signals, such as those from service providers that provide media content on a subscription or a pay per view basis, the media codec device 102 may decrypt the protected media signal as part of the decoding process. In most instances, the encoded media signal is encrypted such that the media codec device 102 decrypts the media signal prior to employing the proper codec. However, in some instances, the encoded media signal may not be decrypted but the decoded media signal may be encrypted. In that case, the media codec device 102 may apply the codec first and then decrypt the decoded information to complete the decoding process. The media codec device 102 may determine whether to decrypt before or after the application of the codec, either by negotiation, mapping in memory, or by information carried by the media signal itself.

The decryption process may involve both a decryption algorithm and a decoder key. Either or both may be unique to each source of protected media content and/or unique to this consumer. Furthermore, different media signals of the same source may have different decryption algorithms and/or decoder keys. The media codec device 102 maintains those decryption algorithms and decoder keys in a memory space which is discussed further below with reference to FIG. 2.

In some embodiments, the decryption algorithm and/or decoder keys are maintained within a memory space of the hardware decoder, and they may be isolated by the hardware decoder from external access. In this manner, the confidential nature of the decryption algorithm and/or the decoder key can be maintained, even in a media codec device 102 that is not service provider specific and that is not limited to protected media signals from a single service provider. Thus, service providers usually unwilling to allow access to their content unless their specific hardware platform is being used to decode the media signals may allow such a media codec device 102 to obtain, decode, and distribute their media signals. This frees the user from being required to maintain service provider specific hardware and likewise frees the service provider from being required to offer such hardware.

As discussed below, the decryption algorithms and decoder keys maintained in the memory space of the media codec device 102, even if within a modifiable memory space of a hardware based decoder, may be imported into and/or deleted from such memory space while the media codec device 102 is in the possession of the user. The decryption algorithms and/or decoder keys may be transferred to the media codec device from a remote source, such as the source of the media content for which the decryption algorithms and decoder keys are relevant or from a third party source that acts as a decryption algorithms and/or decoder key broker. The transfer may also be encoded including encrypting the encoded data so that the decryption algorithms and/or decoder keys are not vulnerable during transport.

Returning to the situation where the requested media signal has been obtained and decoded, the media codec device 102 then distributes the decoded media signal to the appropriate playback device 124, 128, or 134. The distribution of the decoded media signal may occur in various manners. Furthermore, one or more media transfer units 114, 116 may be present in some embodiments to deliver the media signals to the various locations throughout the premise where such locations may be distantly located from the media codec device 102.

For instance, the media codec device 102 may have a data connection to the media transfer unit 114 that injects a decoded media signal onto a coaxial cable at the premise. The media signal may be injected in one or more of various standard formats, such as an analog National Television System Committee (NTSC) signal on a carrier channel or as a digital Advanced Television System Committee (ATSC) signal on a carrier channel or as another signal type capable of transfer on a coaxial cable. As another example, the media codec device 102 may have a data connection to the media transfer unit 116 that localcasts a media signal over the air, such as by using a low power Very High Frequency (VHF) and/or Ultra High Frequency (UHF) transmission. The media signal may be localcast as one or more of various formats such as an analog NTSC signal on a carrier channel or as a digital ATSC signal on a carrier channel or as another signal type capable of transfer over the air.

The media transfer unit 114, as well as other media transfer units discussed herein, may re-encode the data of the media signal from the media codec device 102 where the transfer process of the media signal to the playback devices 124, 128 relies on encoded data. The encoding may be entirely different than the encoding of the media signal being received by the media codec device 102. In this case, the down stream devices, such as playback devices 124, 128, and/or a media display unit 126 which is discussed in further detail below have the capability to decode that encoding format used by the media transfer unit 114.

In the case of NTSC, ATSC, or other signals provided over coax or by localcast, the playback device 128 may have the ability to directly receive such signals using a built-in tuner, and decode such signals when in an encoded digital format. Thus, the playback device 128 may tune to the channel that the media signal of choice is being sent over to directly receive the media signal. As discussed below, the remote 132, which is the one known by the user to correspond to the playback device 128, may have an identification that is mapped by the media codec device 102 to a given media transfer unit, such as the media transfer unit 116, that is using a carrier channel that the playback device 128 is set to receive. Thus, according to exemplary embodiments, use of the remote control 132 to select or control a media signal results in the media signal being provided to the corresponding playback device 128.

Other types of the media transfer units 114, 116 may also be present. In some embodiments the media transfer units 114, 116 may be present even when a playback device is in relatively close proximity to the media codec device 102. For instance, the given playback device 124, 128 may not have a data input compatible with a data output of the media codec device 102 such that a direct connection of the media codec device to the playback device 124, 128 is not possible. In that case, the media transfer unit 114, 116 may be present to adapt the data output by the media codec device 102 to a format compatible with an input of the playback device 124, 128. For instance, the playback device 124 may have only analog inputs and the media transfer unit 114, 116 may adapt the data output of the media codec device 102 into a proper analog format.

Some embodiments of the media codec device 102 may also provide direct connections between the media codec device 102 and playback devices, such as the playback device 134, within a connectable range to the media codec device 102. For instance, the data output of the media codec device 102 may comply with a data standard for media delivery that is used by inputs of the playback device 134. One example is the High Definition Multimedia Interface (HDMI) for audio and video. Another example may be a Digital Visual Interface in digital mode (DVI-D) for video data and/or a Sony-Philips Digital Interface (S/PDIF) for audio data.

In some situations, the media transfer unit 114, 116 may provide the media signal in a manner that is incompatible with the playback device 124, 128. For example, the media transfer unit 114 may provide a coaxial injection or a localcast using the ATSC standard. The playback device 124 may be capable of tuning only analog cable or over the air channels or otherwise receiving an analog signal. In that case, the media display unit 126 may be used at the playback device 124 to receive the media signal from the media transfer unit 114 and then adapt the media signal for final delivery to the playback device 124. As an example, the media display unit 126 may tune to an appropriate carrier channel used by the media transfer unit 114, convert the ATSC media signal extracted from the carrier channel to an analog NTSC signal, and output the analog NTSC signal to the playback device 124 on the same or a different carrier channel or as a baseband analog signal.

In addition to the media transfer units 114, 116 that deliver media signals from the media codec device 102 to the playback devices 124, 128, a media transfer unit 120 may also be present at the user premise. This media transfer unit 120 may be present to provide connectivity between the local source 110 of media signals and the media codec device 102 rather than relying on connectivity through the host 104. The media transfer unit 120 may be present to adapt media signals from the local source 110 to a data format that may be received by the media codec device 102. For example, the media transfer unit 120 may obtain an analog media signal and encode the analog media signal into a digital format that the media codec device 102 can decode and distribute. Where the local media source 110 has a digital output compatible with the media codec device 102 and in connectable range of the media codec device 102, then a direct connection may be used instead.

Figure 2:
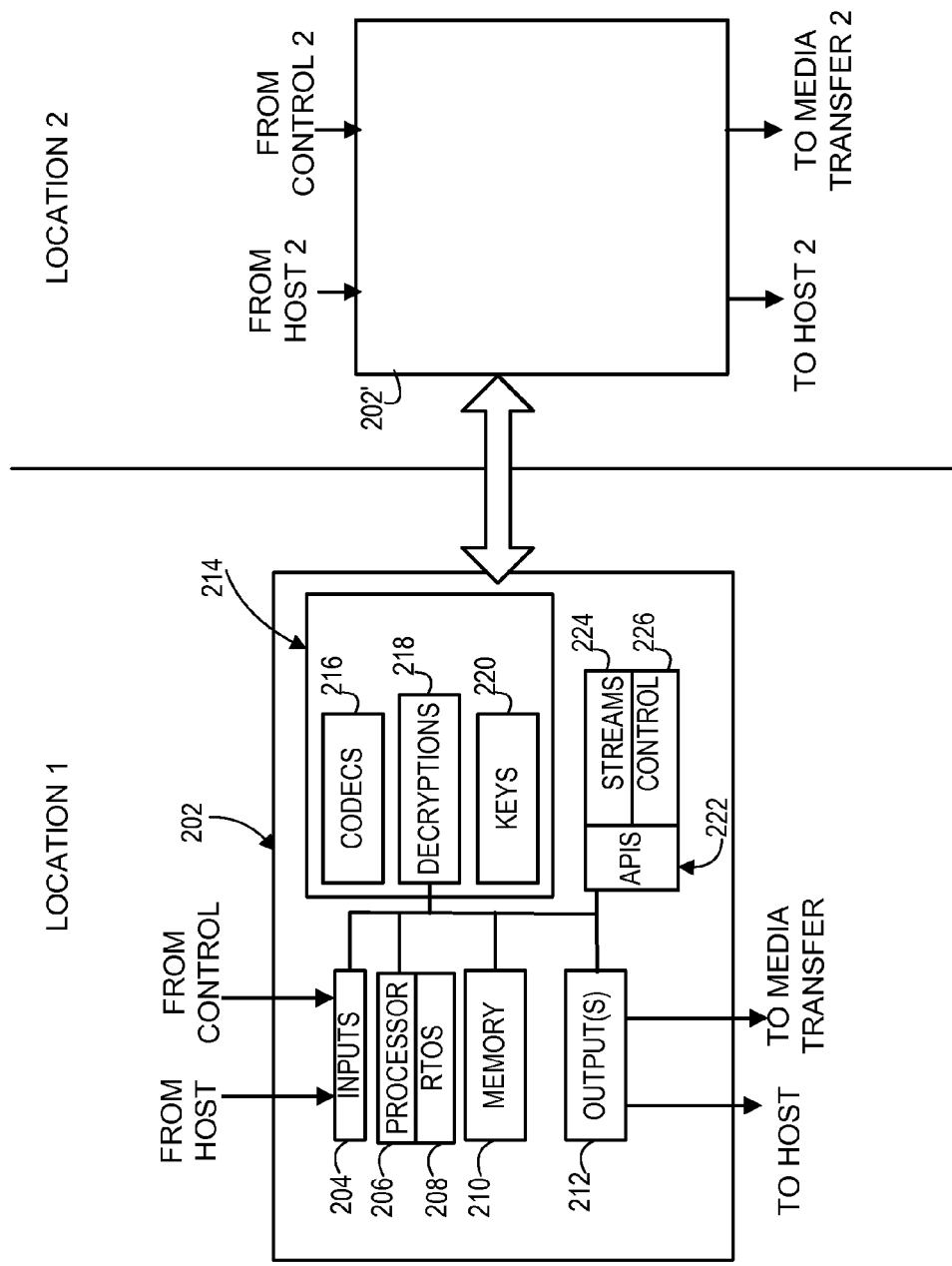
FIG. 2 shows components of one example of a media codec device.

FIG. 2 illustrates the components of one example of a media codec device 202. A decoder 214 is present to receive the encoded media signals and decode the media signals into the media signals that are ready for distribution. While the decoder 214 may be implemented in software in some embodiments, other embodiments may rely on a hardware based decoder 214 so as to maintain the confidential and secure status of decryption algorithms and decoder keys. Within the decoder 214, there may be modifiable memory space that is allocated for on-board codecs 216. These codecs 216 may be pre-stored in the decoder 214 in advance of the user taking possession. Additionally or alternatively, one or more of these codecs 216 may be imported into the decoder 214 via the data network connectivity of the media codec device 202 so as to allow for upgrading to the newly developed codecs 216.

Within the decoder 214, there may also be modifiable memory space that is allocated for on-board decryption algorithms 218. These decryption algorithms 218 may be specific to each source/service provider that the media codec device 202 draws upon for access to media content. As sources/service providers are added or discarded by the user, the decryption algorithms 218 may be imported into or deleted from the allocated memory space. As discussed below, the transfer of the decryption algorithms 218 to be imported and the instruction to delete already stored ones may be done using an encrypted encoding where a secret decryption algorithm and decoder key specifically for the addition or removal of a source/service provider decryption algorithm are used so as to secure the decryption algorithms during transit. Furthermore, as the decryption aspect of the decoding may be done as an entirely internal process of a hardware based decoder 214, the confidential and secure nature of decryption algorithms being employed may be preserved.

Within the decoder 214, there may also be modifiable memory space that is allocated for on-board decoder keys 220. These decoder keys 220 may also be specific to each source/service provider that the media codec device 202 draws upon for access to media content. As sources/service providers are added or discarded by the user, the decoder keys 220 may also be imported into or deleted from the allocated memory space. As discussed below, the transfer of the decoder keys 220 to be imported and the instruction to delete already stored ones may be done using an encrypted encoding where a secret decryption algorithm and decoder key specifically for the addition or removal of a source/service provider decoder key are used so as to secure the decoder keys during transit. Furthermore, as the decryption aspect of the decoding may be done as an entirely internal process of a hardware based decoder 214, the confidential and secure nature of decoder keys being employed may be preserved.

The media codec device 202 may further include other components to handle the general operation. For example, a processor 206 may be present to implement an on-board real time operation system (RTOS) 208. In doing so, the processor 206 may establish communications through a data bus or other data interconnections between input ports 204, output ports 212, the decoder 214, operating memory 210, and any additional modules such as an application programming interface module 222. While both input ports 204 and output ports 212 are shown separately, it will be appreciated that some ports may be present that are bi-directional, such as a data network connection like Ethernet, a USB connection, and the like.

The processor 206 may perform various logical operations to provide the functions of the media codec device 202, including interpreting commands received from remotes, submitting requests on a data network to obtain media signals, and activating the decoder 214 relative to any given media signal being received. Furthermore, the processor 206 may direct any decoded media signals output by the decoder 214 to a respective output 212 that leads to a media transfer unit or a directly connected playback device.

The processor 206 may implement APIs from the API module 222 including stream APIs 224 and control APIs 226. The stream APIs 224 provide the ability for the processor 206 to properly route a request to a source, properly route a decoded media signal to a destination, and to apply any stream, quality, or effects manipulation that may be necessary to achieve the output desired by the user. For instance, upon the decoder 214 outputting the decoded media stream, the processor 206 may act on the decoded media stream to combine multiple streams into a single media signal to produce an on-screen picture-by-picture effect. The processor 206 may manipulate the quality of the media signal from one resolution to another scaled resolution and/or produce any related effects such as to provide on-screen guides and program metadata.

The processor 206 may implement the control APIs to provide for receiving selections from an on-screen guide, select which source is being used to obtain a given media signal, to read and implement any digital rights management (DRM) data that may be embedded within the media signals being received, and so forth.

The processor 206, the memory 210, and decoder 214 are all examples of computer readable media. Computer readable media may store instructions that when performed implement various logical operations. Such computer readable media may include various storage media including electronic, magnetic, and optical storage. Computer readable media may also include communications media, such as wired and wireless connections used to transfer instructions or send and receive other data messages.

FIG. 2 also shows that the same media codec device 202 at a first location may be physically transported for operation at a second location, referred to there as a media codec device 202'. The media codec device 202 at the first location may maintain a connection to a first host, receive control signals from a first set of control receiving units, and direct media signals to a first set of media transfer units. Likewise, once transferred to the second location, the media codec device 202' using the same components, inputs, and outputs, may connect to a second host, receive control signals from a second set of control receiving units, and direct media signals to a second set of media transfer units. Thus, the ability to receive media signals from various sources and distribute them to various playback devices is maintained regardless of physical location.

Figure 3:
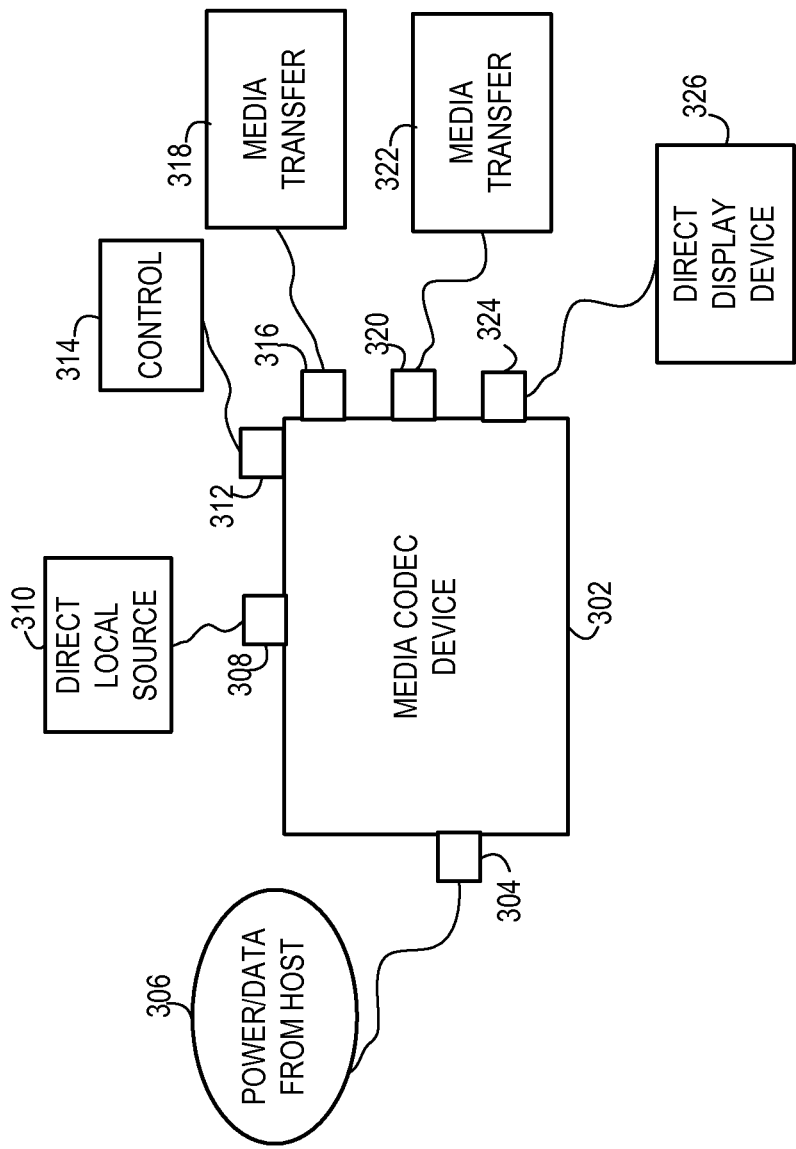
FIG. 3 shows one example of a media codec device and interconnections to related peripherals.

FIG. 3 illustrates one example of the physical connections of an embodiment of a media codec device 302. In this example, the media codec device 302 uses wiring, such as dongles in their general sense, to connect individual ports of the media codec device 302 to various peripheral devices. The media codec device 302 may have a designated port 304 for data and power connectivity to receive power/data 306 from the host. One example of such a port 204 would be a USB port. The media codec device 302 may have other designated ports, which may be of many different types or may all be of the same type such as USB.

A local source 310 may be connected via a cable to a port 308. The port 308 may be bi-directional so that media can be received from the local source 310 or sent to the local source for storage while control signals may also be sent to the local source from the media codec device 302. A USB port would be one example of such a port 308.

A control receiver unit 314 may be connected to a designated port 312. Where the control receiver unit 314 is for the sole purpose of providing control signals to the media codec device 302, the port 312 may be a unidirectional input port if so desired. However, where status or other informational signals may be passed to the media codec device 302 from the control receiving unit 314, then bi-directional ports are used.

Media transfer units 318, 322 are connected to output ports 316, 320, respectively. Where the media transfer units 318, 322 are for the sole purpose of distributing media signals to the playback devices, the ports 318, 322 may be unidirectional output ports if so desired. Where the media transfer units 318, 322 also transfer media to the media codec device 302 or transfer status or other informational signals, then bi-directional ports are used.

The media codec device 302 may also utilize ports 324 that directly connect to a playback device 326 in connectable range. Such ports 324 may be unidirectional where only media signals are being transferred, such as for S/PDIF signals. However, such ports 324 may be bi-directional where information is exchanged, as in the case of HDMI connectivity.

While FIG. 3 shows a plurality of ports for various purposes, it will be appreciated that a single high-speed port may be utilized to connect to a hub that connects to each individual cable or dongle, rather than each directly connecting to the media codec device 302. Using a hub allows for easier portability of the media codec device between locations as each cable or dongle need not be disconnected but instead merely the connection of the media codec device to the hub is disconnected.

Figure 4:
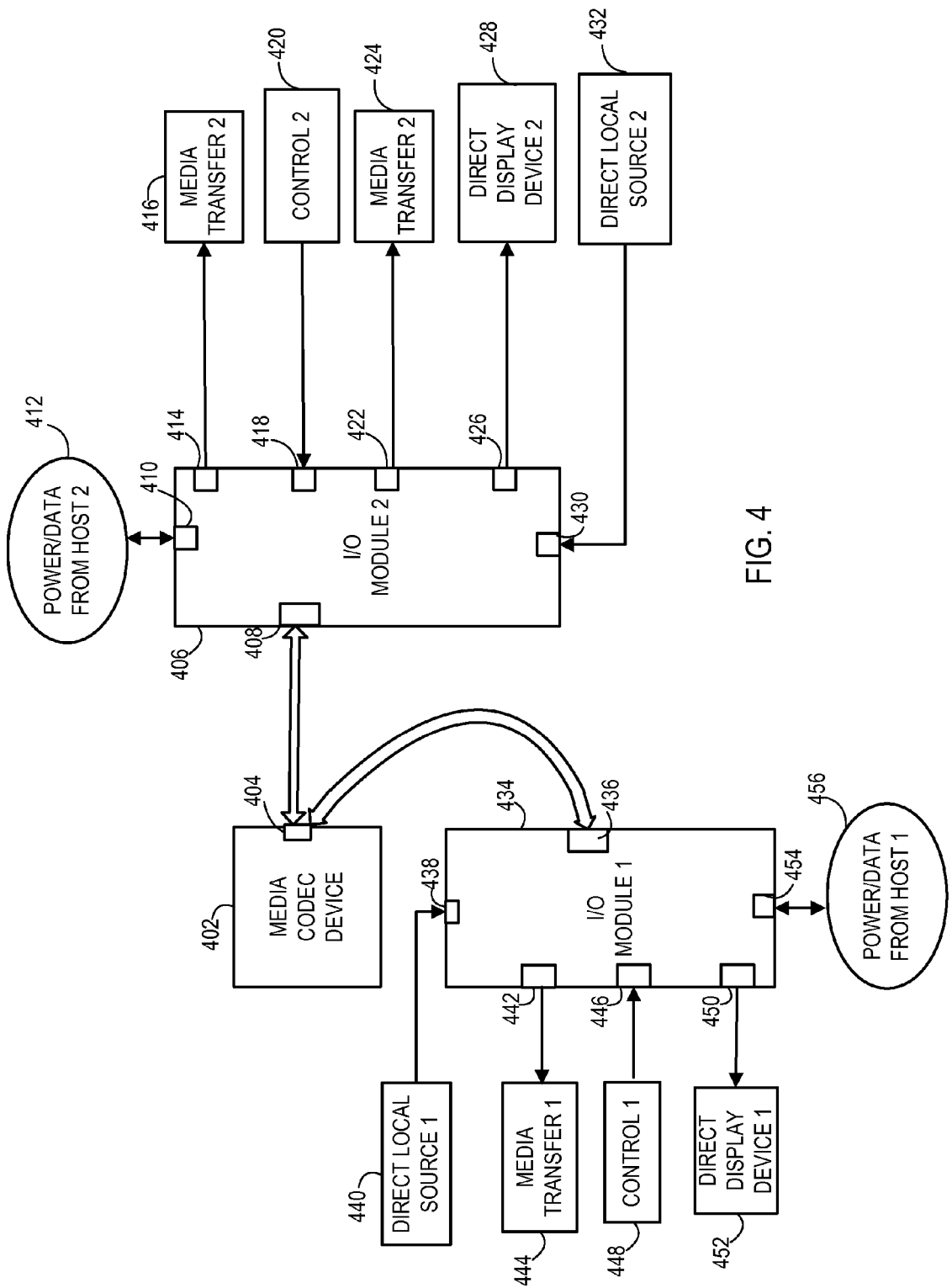
FIG. 4 shows another example of a media codec device and interconnections to related peripherals.

FIG. 4 shows one such example of a media codec device 402 that employs a separate hub at each location where the media codec device 402 may be used. For instance, a hub 434 may be present at a first location, such as a vacation home of the user. A hub 406 may be present at a second location, such as the primary home of the user. The hubs 406, 434 act as input/output modules for providing a simple connectivity to the media codec device 402.

When the user wishes to use the media codec device 402 to obtain media content at the first location, the user connects the media codec device 402 to the hub 434 by interconnecting a bi-directional hub connector 404 to matching hub connector 436. This connection may use a standard high-speed device-to-device connection such as USB v2 or higher, an Institute of Electrical and Electronics Engineers (IEEE) 1394 connection, Ethernet, or similar connection type. According to some embodiments, the physical and electrical connections between the connector 404 of the media codec device 402 and the connector 436 of the hub housing 434 may be brought about by the user using a cable. In other embodiments, the connector 404 of the media codec device 402 may be a mate to the connector 436 of the hub housing 434 so that the media codec device 402 is a plug-in to the hub housing 434.

Upon being connected in this manner, the media codec device 402 then gains access to the various peripheral devices connected to the hub 434. In the example shown, the hub 434 maintains connections to power/data 456 of the host via connector 454, and to a directly connected playback device 452 via a connector 450. The hub 434 of this example further maintains connections to a control receiving unit 448 via a connector 446, to a media transfer unit 444 via a connector 442, and to a local source 440 via a connector 438. It will be appreciated that a different number of peripherals and corresponding ports may be present for such a hub depending upon the needs of the user.

When the user travels to the second location, the user may wish to bring along the media services that the user enjoys when at home. In some embodiments, the services being subscribed to by the user may have no location restriction on them other than the constraint that a media codec device equipped with the proper codecs, decryption algorithms, and decoder keys be present. In that case, the user may move the media codec device 402 to the second location to enjoy the same media services there without having to pay separately for media services for both locations.

When present at the second location, the user may interconnect the port 404 to a port 408 of the hub housing 406 to provide the physical and electrical connectivity. Upon doing so, the media codec device 402 gains access to each of the ports and the connected peripherals at the second location. In the example shown, the hub 406 maintains connections to power/data 412 of the second location's host via a connector 410, and to a directly connected playback device 428 via a connector 426. The hub 434 of this example further maintains connections to a control receiving unit 420 via connector 418, to a first media transfer unit 416 via a connector 414, to a second media transfer unit 424 via a connector 422, and to a local source 432 via a connector 430.

FIGS. 5-9 illustrate the components of various peripherals that a media codec device, such as the media codec device 102, may utilize. FIG. 5 shows a media transfer unit 502 that includes an input data connection 504 that receives media signals as data from the media codec device 102. The media signals are then processed by a media signal adaption module 506 to put the media signal into a format for delivery over whatever medium this media transfer unit 502 is configured to utilize. The media signals are output onto the medium via an output device 508.

For example, this media transfer unit 502 may be a coax injector and according to various embodiments may inject either or both of NTSC and ATSC signals or other signals on existing coaxial cabling within the user premise. Furthermore, this media transfer unit 502 may utilize a fixed carrier channel, such as in the VHF or UHF band, or may offer any carrier channel within a designated band that is available on the coaxial cable. For ATSC signals, the media transfer unit 502 may transmit on any or all of the six subchannels of any given carrier channel. In such examples, the output device 508 is a coaxial transmitter that connects directly to the coaxial cabling within the premise.

As another example, this media transfer unit 502 may be a localcast device. The media transfer unit 502 may utilize a fixed over the air carrier channel, such as in the VHF or UHF band, or may offer any carrier channel within a designated band that is available for low power over the air transmission. As with the coax injector example, the various embodiments of the localcasting media transfer unit 502 may also transmit NTSC, ATSC, or both and may transmit on any of the 6 ATSC subchannels of a carrier channel. In such examples, the output device 508 is an over the air transmitter antenna that directly outputs wireless radio frequency waves.

Other examples of the media transfer unit 502 are also applicable. For instance, the media transfer unit 502 may employ signaling over existing telephone, network, or power lines within a user premise to distribute media signals on carrier channels.

FIG. 6 shows an example of a media display unit 602. As discussed above, the media display unit 602 may be used to receive signals from the media transfer unit 502. The media display unit 602 includes an input module 604 that directly interfaces to the medium being used for distribution, such as the coaxial cable, telephone line, network line, power line, or the over the air medium within the premise. The module 604 provides the media signals as electrical signals to the media signal adaption module 606 where the media signals are converted to a format that is compatible with the inputs of a playback device that are connected directly to an output module 608.

For instance, the module 606 may convert ATSC signals to NTSC signals. As another example, the media display unit 602 may serve as an adapter between a playback device, such as the playback device 124, in close proximity to the media codec device 102 by directly interfacing to a digital output of the media codec device 102, e.g., HDMI, and the module 606 converts such media signal data to an ATSC or NTSC signal so long as a copy protection flag of the media signal data allows such conversion.

FIG. 7 shows an example of a control receiving unit 702. This unit 702 includes an input module 708 that receives control signals from a control transmitter unit or directly from a remote control. The control signals may arrive in one of various different formats such as an RF signal, a Wi-Fi signal, a Bluetooth® signal, and the like. The input module 702 receives the signal from the air, cable, telephone line, power line, network line or any other medium being used to transfer the control signals.

A control signal adaption module 706 then formats the control data signal into a format compatible with the media codec device 102. For instance, the module 706 may convert a proprietary control data scheme being output by a remote control into a standardized control data scheme recognized by the media codec device, for embodiments where the media codec device 102 does not recognize such proprietary control data schemes of the remote controls via its control APIs. As another example, either the input module 708 or the adaption module 706 may extract the control data from the control data signal being received by the input module 708 where the control data signal uses a carrier wave.

Once control data that is compatible with the media codec device 102 has been achieved, this control data is then presented to an input port of the media codec device 102 via an output module 704. As discussed above, this could be any number of data connections such as USB, Ethernet, or IEEE 1394.

Figure 8:
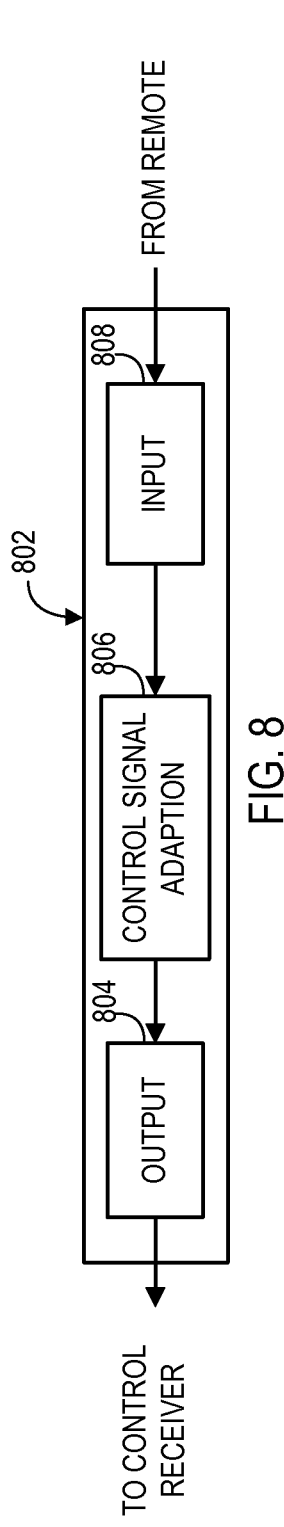
FIG. 8 shows components of one example of a control transmitter unit.

FIG. 8 shows an example of a control transmitting unit 802. This unit 802 includes an input module 808 that receives signals sent by a remote control, such as short range infrared signals that cannot reach the media codec device 102. An adaption module 806 takes the control data from the original remote control signal and formats it for transfer over a medium. In some embodiments, the medium for transfer of the control signal is the same medium for which the media signals are being delivered. As one example, coaxial injection is performed by an output module 804 of the control transmitting unit 802 to send the control signals over the coaxial cable while media signals are being injected onto the same coaxial cable by a media transfer unit, such as the media transfer unit 502. As another example, over the air RF transmission may be performed by the output module 804 while the media transfer unit 502 transmits media signals on RF transmissions over the air as well. Injection of control signals on telephone lines, power lines, or networking lines are also examples.

Figure 9:
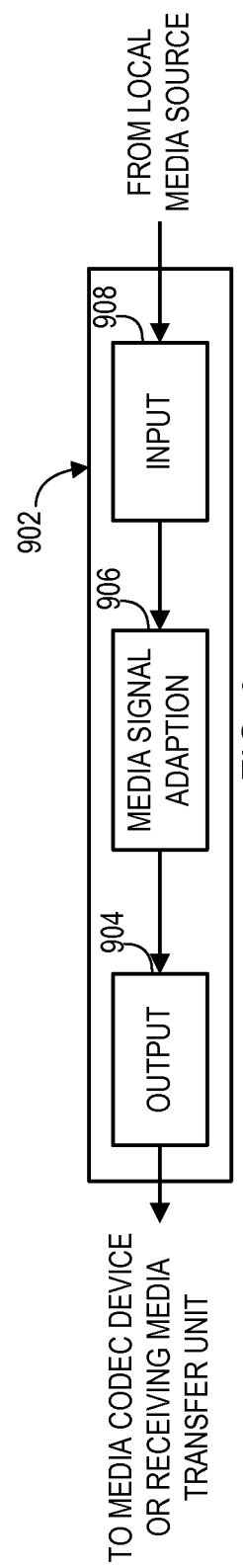
FIG. 9 shows components of another example of a media transfer unit.

FIG. 9 shows an example of a media transfer unit 902 that is used for sending media to a media codec device, such as the media codec device 102, from a local source, such as the local source 110. An input module 908 receives the media signal in one of various forms. For example, the media signal may be an NTSC base band signal or may be an NTSC or ATSC signal on a carrier channel. An adaption module 906 formats the received media signal for submission to the media codec device 102, such as by converting an analog signal to a digital signal of an encoded format, converting a unencoded digital signal to an encoded format, and so forth. The formatted media signal data is then output by an output module 904 to an input port of the media codec device 102, such as via a USB, Ethernet, or IEEE 1394 connection.

Figure 10:
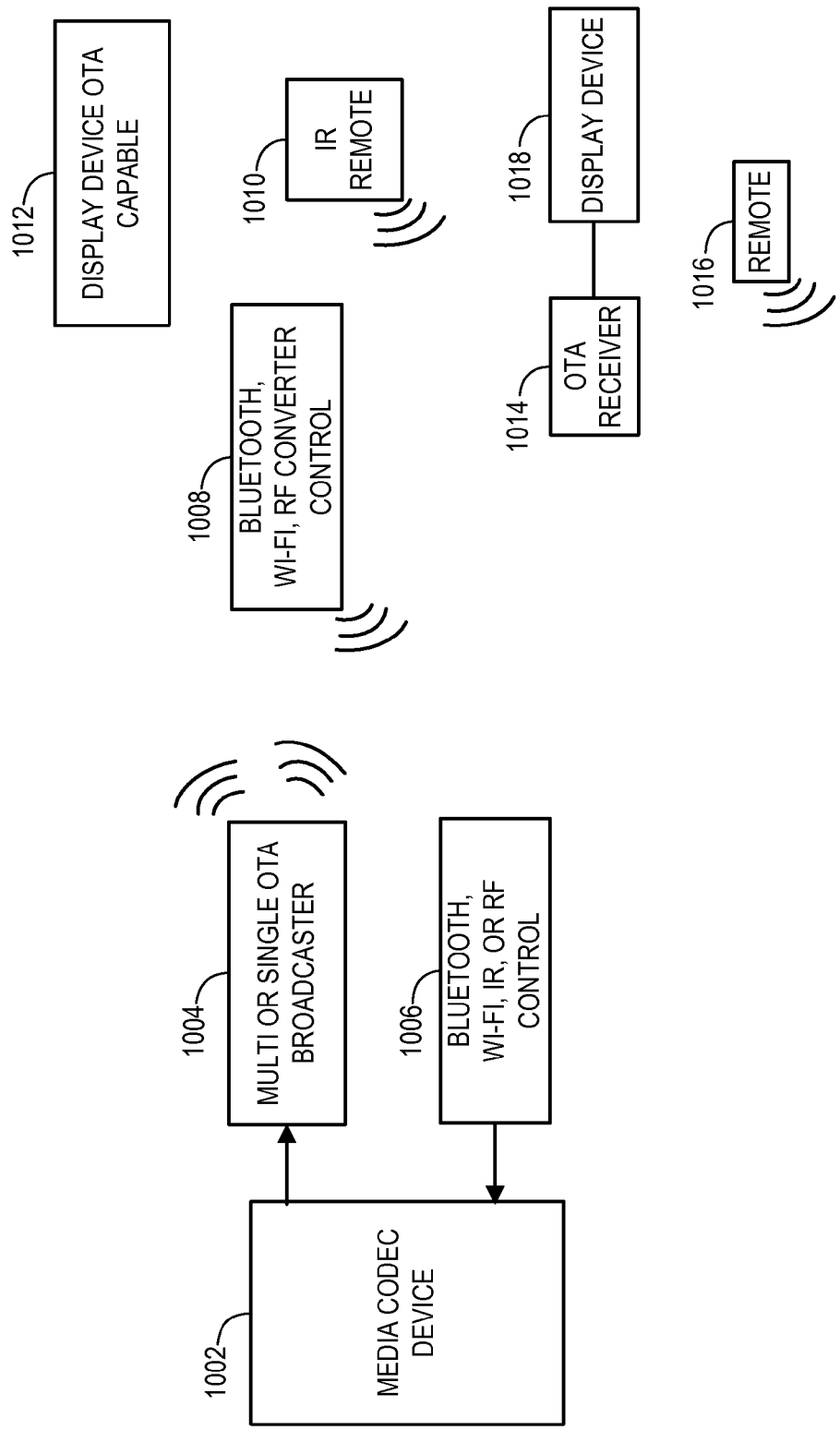
FIG. 10 shows one example of a configuration for distributing media content from an illustrative media codec device.

FIG. 10 illustrates one example of a media signal distribution configuration. Here, a media codec device 1002 outputs decoded media signal data to a media transfer unit 1004 in the form of a low power over the air (OTA) localcasting unit. The media transfer unit 1004 may be a single carrier channel localcasting unit or a multiple carrier localcasting unit, and in either case may be either an analog transmitter, a digital transmitter, or may transmit both analog and digital. For instance, the media transfer unit 1004 may be capable of transmitting multiple NTSC signals on different carrier channels, multiple ATSC signals on different carrier channels and/or on different carrier sub-channels, and/or transmitting both NTSC and ATSC signals on the same and different carrier channels. The media codec device 1002 provides as many media signal data streams as the media transfer unit 1004 is capable of localcasting at a given time.

The media transfer unit 1004 may have a separate media signal input for each channel to be localcast, or may have a single data input with logic that reads an identifier of the particular localcast channel to be used for a given media signal. Likewise, the media codec device 1002 may have a separate media signal output for each media signal input of the media transfer unit 1004 or may define outputs logically by tagging media signals being output with different identifiers corresponding to the localcast channels to be used by the media transfer unit 1004 for the media signals.

The media codec device 1002 receives control signals via a control receiving unit 1006. The control receiving unit 1006 of this example may receive signals of various types, such as Bluetooth® protocol signals, Wi-Fi signals, IR signals, and/or RF signals that contain remote control data. The control receiving unit 1006 extracts the control data from such received signals and provides such remote control data to the media codec device 1002 for implementation. As discussed above, in some embodiments the control receiving unit 1006 may include the capability of modifying the remote control data from one format that is incompatible with the media codec device 1002 to another format that is compatible.

The media signals that are being localcast may be tuned in directly by an OTA capable playback device such as a display device 1012. The display device 1012 may be a television that is capable of receiving NTSC signals on a carrier channel. Likewise, the display device 1012 may be a digital OTA capable television that receives ATSC signals on a carrier channel or sub-channel. The user tunes the playback device to an OTA channel that is assigned to this playback device 1012 and to a corresponding remote control 1010 being used to control the media signals being displayed.

The remote control 1010 is present in proximity to the playback device 1012. In the example shown, the remote control 1010 uses line of sight IR signaling which limits the range of the remote control 1010 inside of a room, where objects and walls block the signal. The media codec device 1002 may be located at a distance from the IR remote control 1010, such as in another room of the same building, and be out of range of the IR remote control 1010.

To allow the IR remote control 1010 to control the media signals on the OTA channel being viewed on the playback device 1012, a control transmitting unit 1008 is present. This control transmitting unit 1008 picks up the remote control signals which may include an identifier (ID) of the remote control 1010, or even an ID of the control transmitting unit 1008 in lieu of an ID of the remote control 1010, and transmits those using a longer range signal. For instance, the control transmitting unit 1008 may employ the Bluetooth® protocol for medium distances, such as directly to the adjacent room, or Wi-Fi or RF signals to reach greater distances. The RF signals being sent may fall within the same carrier medium frequency bands of the OTA media signals being sent by the media transfer unit 1004 such that the media signals and the control signals share a common distribution medium.

The ID being included in the control signals is received by the media codec device 1002. The media codec device 1002 uses this ID to determine which media signal output needs some change being requested by the control signals. For instance, the user of the playback device 1012 may choose to display a guide of the available television programs on other channels or streams that the media codec device 1002 is capable of receiving and distributing. This request for a guide display is tagged with the ID of the remote, or an OD of the control transmitting unit 1008 in lieu of the remote ID. The media codec device 1002 then displays the guide as an effect on a media signal being sent out on an output that is known to be localcasted by the media transfer unit 1004 on the OTA channel tuned to by the playback device 1012. Thus, the playback device 1012 displays the requested guide.

A display device 1018 may be incapable of receiving OTA signals but the user may wish to view localcast media signals on the display device 1018 and it may be assigned an OTA channel to allow it to have its media signals differ from those being viewed on the display unit 1012. A media display unit 1014, in this example an OTA receiver, may be included to receive the localcast OTA signals on behalf of the display device 1018. The media display unit 1014 may be capable of receiving NTSC signals on a carrier channel. Likewise, the media display unit 1014 may be a digital OTA capable tuner that receives ATSC signals on a carrier channel or sub-channel. The user tunes the media display unit 1014 to an OTA channel that is assigned to this playback device 1018 and to a corresponding remote control 1016 being used to control the media signals being displayed.

The remote control 1016 is present in proximity to the playback device 1018. In the example shown, the remote control 1016 uses a longer range signaling such as Bluetooth® signaling, Wi-Fi signaling, or RF signaling. So, even though the media codec device 1002 may be located at a distance from the remote control 1016, such as in another room of the same building, the media codec device 1002 via its control receiving unit 1006 may still be in range of the remote control 1016 such that a control transmitting unit 1008 is not needed in proximity to the playback device 1018. As with the control transmitting unit 1008 discussed above, the RF signals being sent by an embodiment of the remote control 1016 may fall within the same carrier medium frequency bands of the OTA media signals being sent by the media transfer unit 1004 such that the media signals and the control signals related to the playback device 1018 also share a common distribution medium.

The control receiving unit 1006 picks up the remote control signals from the remote control 1016 which may include an ID of the remote control 1016. The ID being included in the control signals is received by the media codec device 1002. The media codec device 1002 uses this ID to determine which media signal output needs some change being requested by the control signals of the remote control 1016. The media codec device 1002 then provides the requested change on a media signal being sent out on an output that is known to be localcasted by the media transfer unit 1004 on the OTA channel tuned to by the display unit 1014 which is a different OTA channel than that assigned to the other playback device 1012. Thus, this playback device 1018 displays the requested change.

Figure 11:
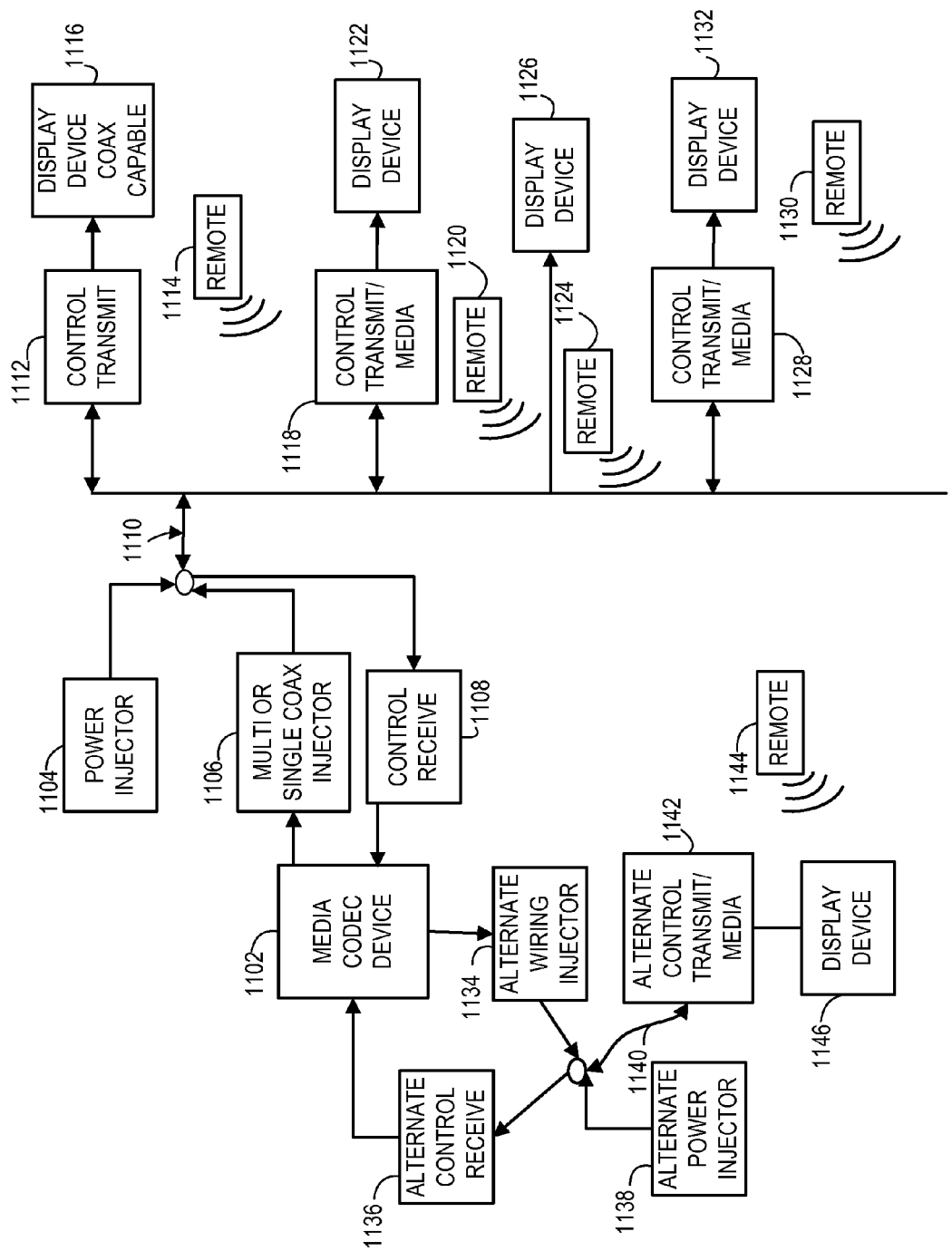
FIG. 11 shows another example of a configuration for distributing media content from an illustrative media codec device.

FIG. 11 shows an example of media signal distribution from a media codec device 1102 using cabling that typically already exists within a given dwelling or other premise. In this example, the premise of the user includes cabling such as coaxial cabling 1110 typically used to deliver cable television channels. The premise may also include other cabling 1140, such as power lines, telephone lines, and/or data lines.

The media codec device 1102 utilizes a media transfer unit 1106 which in this example is a coaxial injector unit. According to various embodiments, this media transfer unit 1106 may inject media signals on a single NTSC cable channel, on multiple NTSC cable channels, on a single ATSC channel or sub-channel, on multiple ATSC channels or sub-channels, or on both NTSC and ATSC channels and sub-channels. The media codec device 1102 provides as many media signal data streams as the media transfer unit 1106 is capable of injecting at a given time.

The media transfer unit 1106 may have a separate media signal input for each channel to be injected, or may have a single data input with logic that reads an identifier of the particular injection channel to be used for a given media signal. Likewise, the media codec device 1102 may have a separate media signal output for each media signal input of the media transfer unit 1106 or may define outputs logically by tagging media signals being output with different identifiers corresponding to the injection channels to be used by the media transfer unit 1106 for the media signals.

In addition to injecting media signals, a power injector 1104 may be present to inject electrical power onto the coaxial cable 1110 for consumption by other devices utilizing the coaxial cable for signaling. For instance, one or more control transmitting units 1112 may be present and may utilize the coaxial cable 1110 to direct control signals back to a control receiving unit 1108 while receiving power through the coaxial cable 1110. As other examples, combined function devices may be present such as control transmitting/media display units 1118, 1128 that receive media signals and send control signals while also receiving power through the coaxial cable 1110. In addition to powering such remotely located devices, the media transfer units 1106 and control receiving units 1108 may also be connected to the coaxial cable 1110 and may also receive operating power through the coaxial cable 1110.

In the example shown, a display device 1116 that is coaxial cable capable receives media signals directly from the media transfer unit 1106 by being tuned to the cable channel that is assigned to it. For example, the display device 1116 may have an on-board cable tuner for NTSC and/or ATSC signals. Thus, the display device 1116 displays whatever media signals are injected onto that cable channel assigned to it. The control transmitting unit 1112 is present and connected in-line on the coaxial cable 1110, acting as a throughput for media signals but providing control signal injection for control signals received from a remote control 1114. In this case, the remote control 1114 is an IR remote or other short range remote incapable of transmitting signals that reach the control receiving unit 1108. An ID of the remote control 1114, or an ID of the control transmitting unit 1112 in lieu of an ID of the remote control 1114, is provided with any control signals being injected.

The media codec device 1102, upon receiving any control signals that have first been received by the control receiving unit 1108 via the coaxial cable 1110, acts upon the control signals to provide a requested change to the media signal. This media signal is provided to the media transfer unit 1106 for injection on the cable channel that is assigned to the display device 1116 so that the display device 1116 ultimately displays the change that has been requested.

A display device 1122 that may not be coaxial cable capable is connected via a cable other than a coaxial cable to a combined control transmitting/media display unit 1118. The connection between the display device and the unit 1122 may be via an analog connection such as an S-video connection, a composite video connection, a component video connection, a Video Graphics Array (VGA) connection, or an analog DVI connection. The connection could also be a digital one, such as a DVI-D or an HDMI connection.

The combined function unit 1118 allows a single in-line coaxial device to receive injected media signals and convert them for output to the display device 1122 while also injecting control signals received from a remote control 1120 onto the same coaxial cable 1110. It will be appreciated that two in-line coaxial devices, each providing a single function, could be used in place of the combined function unit 1118.

Like that discussed above for remote control 1114, the remote control 1120 may submit an ID, or the control transmitting portion of unit 1118 may submit an ID in lieu of the remote control 1120, along with the control signal. The media codec device 1102 may then act on the control signal by applying the requested change to the media signal that is known to be injected on the cable channel assigned to the display device 1122. Thus, the display device 1122 displays the media signal including the change that has been requested.

A display device 1126 may be coaxial cable capable is connected directly to the coaxial cable 1110. In this example, the display device 1126 includes a cable tuner that is tuned to whichever cable channel is assigned to it. A remote control 1124 is used to request changes to whatever media signal is being injected on the cable channel assigned to the display device 1126. The remote control 1124 may be a longer range remote that produces control signals including an ID that can be obtained by the control receiving unit 1108 for embodiments where the control receiving unit 1108 can receive such control signals from wireless transmissions.

Alternatively, the remote control 1124 may submit its signals directly to the display device 1126. The display device 1126 may have the capability to inject the received control signals onto the coaxial cable. The injected control signals may include the ID of the remote control 1124, or an ID of the display device 1126 in lieu of an ID of the remote control 1124. The media codec device 1102 may then apply the requested changes to whichever media signal is known to be injected on the cable channel assigned to the display device 1124.

A display device 1132 may be incapable of receiving coaxial cable signals like display device 1122. Similarly, a combined function unit, such as the control transmitting/media display unit 1128, may be present to receive the injected media signals and to inject control signals, or two separate in-line single function units may be used. A remote control 1130 may be used to transmit control signals to the combined function unit 1128 where they are injected toward the control receiving unit 1108 and hence the media codec device 1102. As with the other cases, an ID of the remote control 1130, or an ID of the combined function unit 1128 in lieu of the ID of the remote control 1130, are sent upstream to the media codec device 1102 so that the proper media signal receives the requested change.

As with the display device 1122, the cable connection between the combined function unit 1128 and the display device 1132 may be of various forms depending upon inputs of the display device 1122. For instance, if the display device 1122 accepts digital signals, then the cable may provide HDMI or DVI-D connectivity. If the display device 1122 accepts analog connections, then the cable may provide composite, component, S-video, and/or VGA signals.

As an alternative to or in addition to using the coaxial cable 1110, the media codec device 1102 may rely upon an alternative media transfer unit 1134 that provides for injection on an alternative wiring, such as the cabling 1140. For instance, the media transfer unit 1134 may inject onto telephone lines, power lines, and/or network lines that may be present at the user premise. The media transfer unit 1134 may transmit the media signals on a carrier channel that has a frequency that is out of band relative to the typical signals that may be present on the alternative wiring 1140.

In addition to using the alternative wiring 1140 as a distribution medium for media signals, an alternative control receiving unit 1136 may receive controls signals that have been injected onto the alternative wiring 1140. The control receiving unit 1136 then provides those control signals to the media codec device 1102.

Furthermore, for alternative wiring 1140 that does not already carry electrical power, such as where telephone wiring, network wiring, or power wiring is otherwise unused, then an alternative power injector 1138 may be present. This power injector 1138 may inject electrical power onto the alternative wiring 1140 to power the connected devices. As an alternative, the connected devices may utilize electrical power that is already present such as where the alternative wiring 1140 is telephone wiring carrying a typical −48 direct current Volts, network wiring carrying a typical 5 direct current Volts, or an electrical power wiring carrying a typical 110-120 alternating current Volts. The connected devices may include components such as power converters, regulators and the like to achieve a usable electrical power from that already being carried by the alternative wiring 1140.

A display device 146 is present to display the media signals being distributed over the alternative wiring. The display device 1146 may be unable to directly interface with the alternative wiring 1140 to obtain the media signals. Thus, an alternate control transmitting/media display unit 1142 may be in-line to receive the media signals and then output them to the display device 1146 over a connection that is compatible with an input of the display device 1146.

The control transmitting/media display unit 1142 may also receive control signals from a remote control 1144. If the remote control 1144 is not capable of sending signals that reach the control receiving unit 1136 while the remote control 1144 is in proximity to the display device 1146, then the control transmitting/media display unit 1142 may be used to receive the control signals and then inject them onto the alternate wiring 1140. In this manner, the media signals and the control signals are being distributed over the same distribution medium, namely the alternate wiring 1140.

As discussed above, the remote control 1144 may submit an ID when sending the control signals, or the control transmitting/media display unit 1142 may submit its ID in lieu of an ID from the remote control 1144. This allows the media codec device 1102 to apply the requested change to whichever media signal is being injected on the carrier channel of the alternate wiring 1140 that is assigned to the display device 1146.

While a single display device 1146 is shown, it will be appreciated that multiple display devices may receive media signals being distributed over the alternate wiring 1140. It will be appreciated that the media transfer unit 1134 doing the signal injection may inject a single signal on a carrier or may inject multiple media signals each on its own carrier. It will be appreciated that multiple alternate media transfer units 1134 may be present rather than a single one. It will also be appreciated that the control transmitting/media display unit 1142 may be separated into two single function units rather than the combined function unit 1142 as shown.

Figure 12:
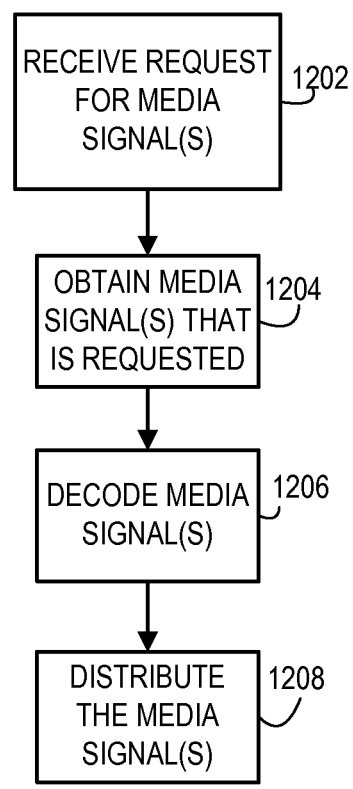
FIG. 12 shows one example of logical operations performed by an illustrative media codec device to provide media services.

FIG. 12 shows a high-level operational flow being performed by various embodiments of the media codec device 102 in order to provide media services to end users of a given location. The media codec device 102 receives requests for media signals at a request operation 1202 in the form of control signals that have originated from various remote controls as discussed above. Upon receiving the request for a media signal, the media codec device 102 then obtains the media signal that has been requested at a signal operation 1204. Here, the media codec device 102 may negotiate for an encoded stream to be delivered to it by a local or remote network resource, such as by contacting an Internet address of a service provider server or by contacting a local network address of a local resource.

Upon the encoded media signal being delivered from the network resource, the media codec device 102 then decodes the media signal at a decode operation 1206. This may involve decryption of protected signals in addition to the decoding itself. After having decoded the media signal, the media signal is distributed via an appropriate output of the media codec device 102 to a media transfer unit 114 or directly to a display device 134 depending upon the connectivity of the device for which the media stream is intended at a distribution operation 1208.

As discussed herein, the media signal may be a continuously flowing data stream. As such, the media codec device 102 may be performing the signal operation 1204, decode operation 1206, and distribution operation 1208 on a continuous basis for a given media signal's stream of data. Thus, the operational flow of FIG. 12 is not intended to limit the operation of any embodiments of the media codec device 102 to a particular sequence considering that for a given media signal stream, multiple stages of these operations may be occurring at the same time to maintain a continuous feed of the media signal stream to the playback devices.

Figure 13:
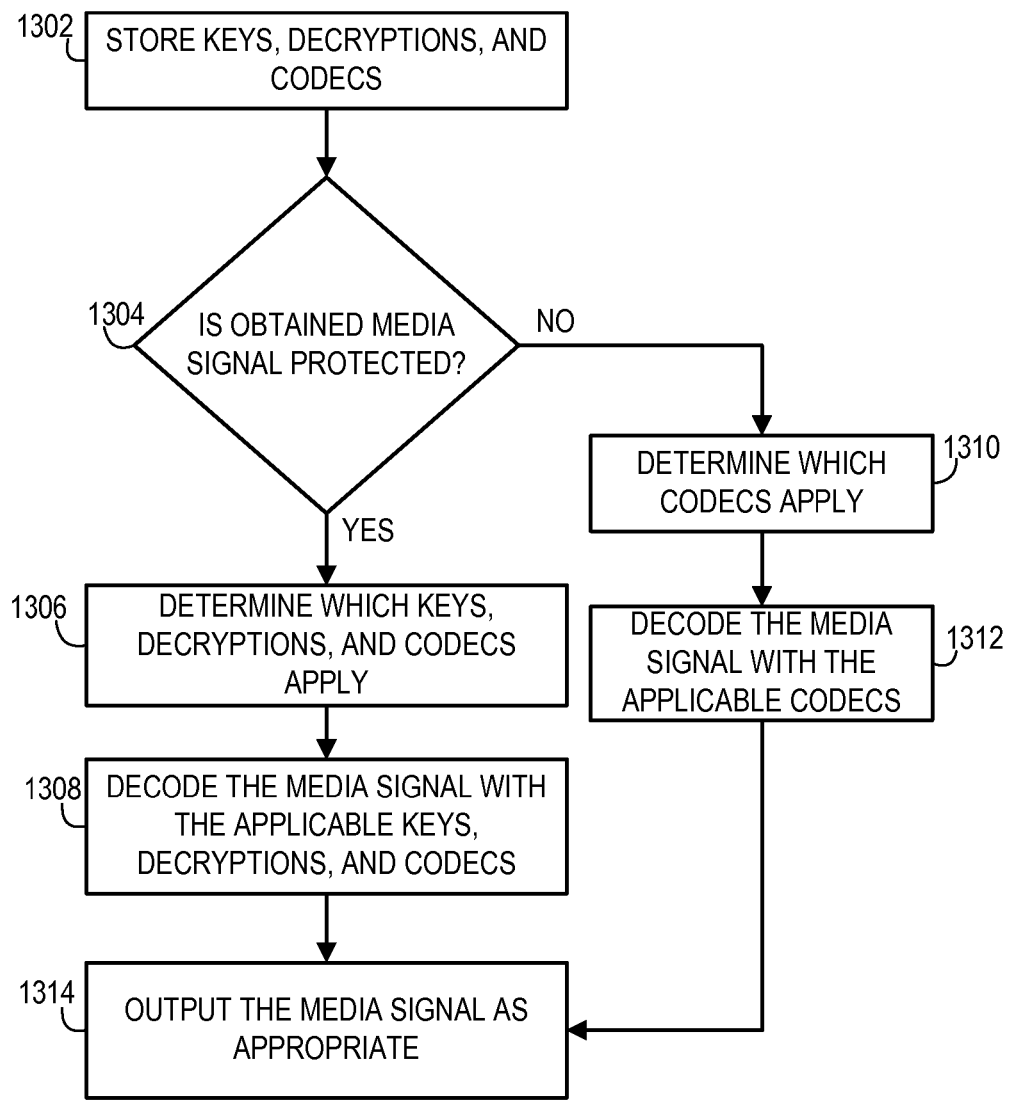
FIG. 13 shows one example of logical operations performed by an illustrative media codec device capable of decoding streams of various origins.

FIG. 13 shows one example of logical operations that may be performed by various embodiments of the media codec device 102 to provide media services where the requested media is protected by the service provider or other source. The logical operations begin by the media codec device 102 storing decoder keys, decryption algorithms, and codecs that are needed to decode the media signals at a storage operation 1302.

This storage may occur during manufacture of the media codec device 102, where the ability to handle unprotected and/or protected media signals from one or more service providers or other sources is built-in. In that case, these collections of information may be hardwired into a decoder chip or may be flashed into firmware of a decoder chip. This storage may occur later while the media codec device 102 is in the possession of the user and is in use within the premise of the user. In that case, these collections of information may be received over a network connection and then flashed into the modifiable memory of the decoder chip such as by a process discussed below in relation to FIG. 14.

Once the decoder keys, decryption algorithms, and codecs for the desired sources of media content are stored within the decoder chip of the media codec device 102, the media codec device 102 may then obtain media signals from such sources at the request of the user(s). According to embodiments such as shown in FIG. 13, once the media signal is obtained the media codec device 102 detects whether the media signal is protected or unprotected at a query operation 1304. Some sources may choose to protect their media signals with encryption to prevent unauthorized access and may charge a subscription fee in order for the media codec device 102 to have the proper decoder key and decryption algorithm needed to decrypt the encoded signal during the decoding process.

Where the media signal to be decoded is protected, then the media codec device 102 determines which decoder keys, decryption algorithms, and codecs apply to that particular media signal at a detection operation 1306. For instance, the media signal may include both audio and video streams and the two streams may require different keys, decryption, and codecs. Likewise, different selections from a given service provider may require different keys, decryption, and codecs, and different service providers require different keys, decryption, and in some cases codecs, from one another. The media codec device 102 determines the appropriate keys, decryption, and codecs in various ways such as by referencing information that may be provided in headers of the media signal and/or stored information about the sources of the media signals.

Once the appropriate keys, decryption, and codecs are identified, the media codec device 102 then begins decoding the media signal at a decode operation 1308. As discussed above, for a protected signal this may involve first decrypting the encoded media signal using the decoder key and decryption algorithm. The decrypted media signal can then be fully decoded using the codec. As another example, in some cases, the media signal may be decoded with the codec and then the decoding process can be completed by decrypting the codec output.

Once the decoded media signal is achieved, the media codec device 102 may then output the media signal to the appropriate downstream device via an appropriate output at an output operation 1314. For instance, the media signal may have been requested by a user whose playback device 124 is receiving media signals by being tuned to a carrier channel output by a media transfer unit, such as the media transfer unit 114. The media codec device 102 may then output the media signal via an output that provides the media signal to the media transfer unit 114 so that the media transfer unit 114 distributes the media signal on the carrier channel such as by a localcast or by injection.

Returning to query operation 1304, the media codec device 102 may detect that the media signal that has been obtained is unprotected and therefore does not require decryption before or after decoding. In that case, the media codec device 102 may determine which codec to apply to the media signal at a detection operation 1310. Again, this determination may be made in various ways, such as by reference to information in headers of the media signal itself and/or by referring to stored information about the service provider or other source.

The media codec device decodes the unprotected media signal at a decode operation 1312 by using the applicable codecs. As discussed above, the media signal may include audio streams, video streams, or a combination of the two and different codecs may apply to each. Once the media signal has been decoded, it is then output to the appropriate downstream device, such as the media transfer unit 114 or the directly connected display device 128 at the output operation 1314.

Figure 14:
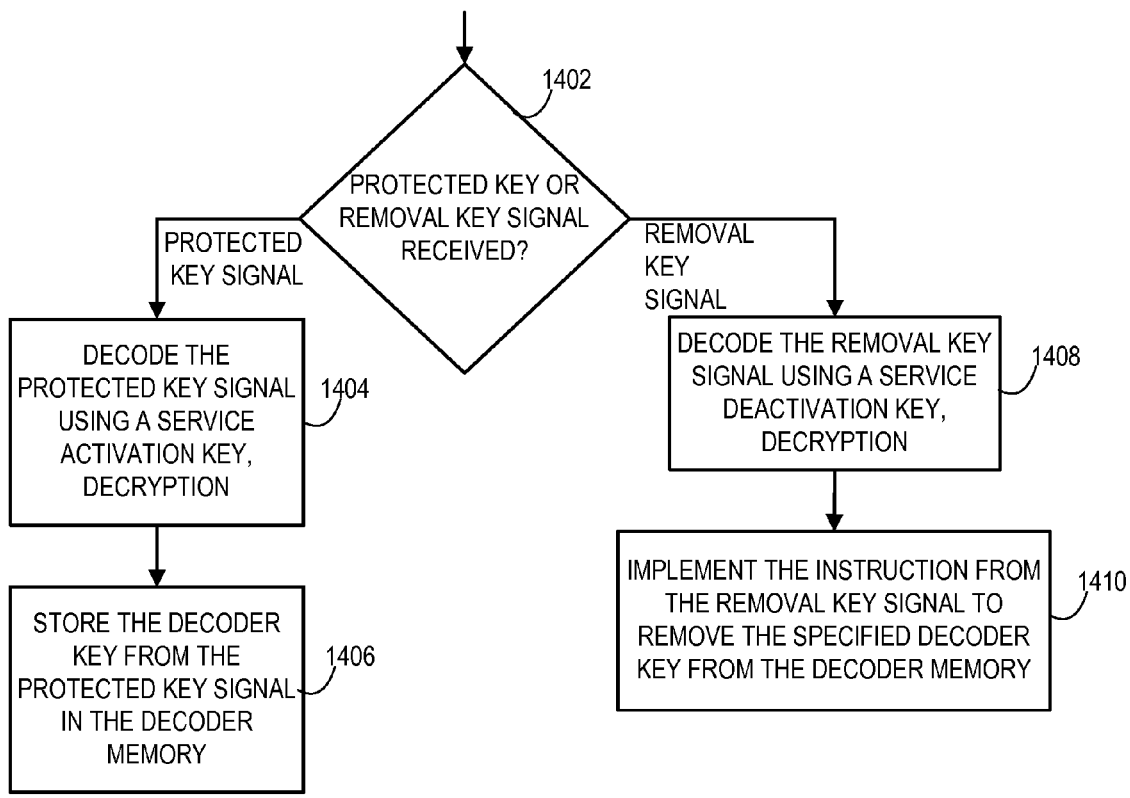
FIG. 14 shows one example of logical operations performed by an illustrative media codec device to configure itself for decoding protected media signals.

FIG. 14 shows one example of logical operations that may be performed by various embodiments of the media codec device 102 when obtaining new decoder keys for a service provider or when removing existing decoder keys. New decoder keys may be imported into decoder memory for various reasons, such as when a service provider wishes to change them for any arbitrary reason, when a service upgrade calls for new decoder keys, when a new service provider is being added to the available sources of media for the media codec device 102, and so forth. Conversely, existing decoder keys may be removed from decoder memory for various reasons, such as when the decoder key is being replaced, or when the media service for which the decoder key is used is being deactivated.

It will be appreciated that the decryption algorithms and even service provider specific codecs may also be imported and/or removed from decoder memory in certain embodiments of a media codec device 102. This may occur for similar reasons as those mentioned above in relation to decoder keys. Thus, while FIG. 14 refers to decoder keys, it will further be appreciated that the same logical operations may also be performed to import and/or remove decryption algorithms and codecs.

Importing and discarding decoder keys, and for that matter decryption algorithms and service provider specific codecs, may be a non-troublesome occurrence while a media codec device 102 is in the possession of a trusted authority. For instance, in some embodiments where the media codec device 102 happens to be a service provider specific piece of hardware, the service provider may import such information to the device while in the possession of the service provider such that the security of the information is not at risk. However, providing such information to a media codec device 102 over a public network connection while the media codec device 102 is in the hands of a consumer is more troubling because the information is exposed during transport and upon being received by the media codec device 102.

To address such concerns, the information may itself be subject to encoding including encryption that requires a decoder key, decryption algorithm, and/or codec that is pre-stored in the hardware decoder chip of the media codec device 102. In that case, the vendor of the media codec device 102 may provide the appropriate encoding and encryption information to each service provider that may wish to provide service to the media codec device 102 so that the service provider can initiate importation of its decoder keys, decryptions, and any proprietary codecs to the media codec device 102 or can be responsive to a request by the media codec device 102 for such importation.

As an alternative, the service providers may provide the decoder keys, decryption algorithms, and/or proprietary codecs to a third party media service broker, such as the vendor of the media codec device 102. This third party media service broken may then handle the encoding and encryption of the service provider decoder keys, decryption algorithms, and/or proprietary codecs and also handle the importation to the media codec device 102 either by initiating the importation or responding to a request.

By maintaining the decoder keys, decryption algorithms, and any proprietary codecs in the modifiable memory of the decoder chip which is accessible only via the internal operations of the decoder chip, the security of such service provider information may be maintained at a level that is acceptable to the service providers. Thus, service providers who may be reluctant to distribute such information where it is stored on general purpose storage medium, such as a hard drive, a memory drive, or in a flashable read only memory (ROM) may be more willing to allow importation of such information to the decoder chip of the media codec device 102.

The logical operations begin at a query operation 1402 where the media codec device 102 determines whether a protected key signal or a removal key signal has been received. The signal may be received based on an unprovoked sending of the signal by a source or may be received based on a prior request sent by the media codec device 102. A protected key signal is one that provides information such as a decoder key to be imported into the modifiable memory of the decoder chip. A key removal signal is one that provides an instruction to remove information such as a decoder key from the modifiable memory of the decoder chip. The type of signal being received may be determined in various manners such as by referencing information in a header of the signal.

When a protected key signal is received, the media codec device 102 then decodes the protected key signal using a service activation decoder key and related decryption algorithm at a decode operation 1404. If further encoded, then a codec may be applied as well to complete the decoding of the protected key signal. The decoder key that has been revealed by the decoding may then be stored into the modifiable memory of the decoder chip at a storage operation 1406. The media codec device 102 may then begin decoding media signals using the stored information.

Returning to the query operation 1402, when a removal key signal is received, the media codec device 102 then decodes the removal key signal using a service deactivation decoder key and related decryption algorithm at a decode operation 1408. If further encoded, then a codec may be applied as well to complete the decoding of the removal key signal. The instruction that has been revealed by the decoding may then be implemented to remove an identified decoder key or other information from the modifiable memory of the decoder chip at a removal operation 1410. The media codec device 102 can no longer decode media signals that require the removed information.

The logical operations of FIG. 14 show that a different decoder key, decryption and even a codec may be used for a protected key signal versus a removal key signal. However, it will be appreciated that for some embodiments the same decoder key, decryption algorithm, and codec may be used for decoding both.

Figure 15:
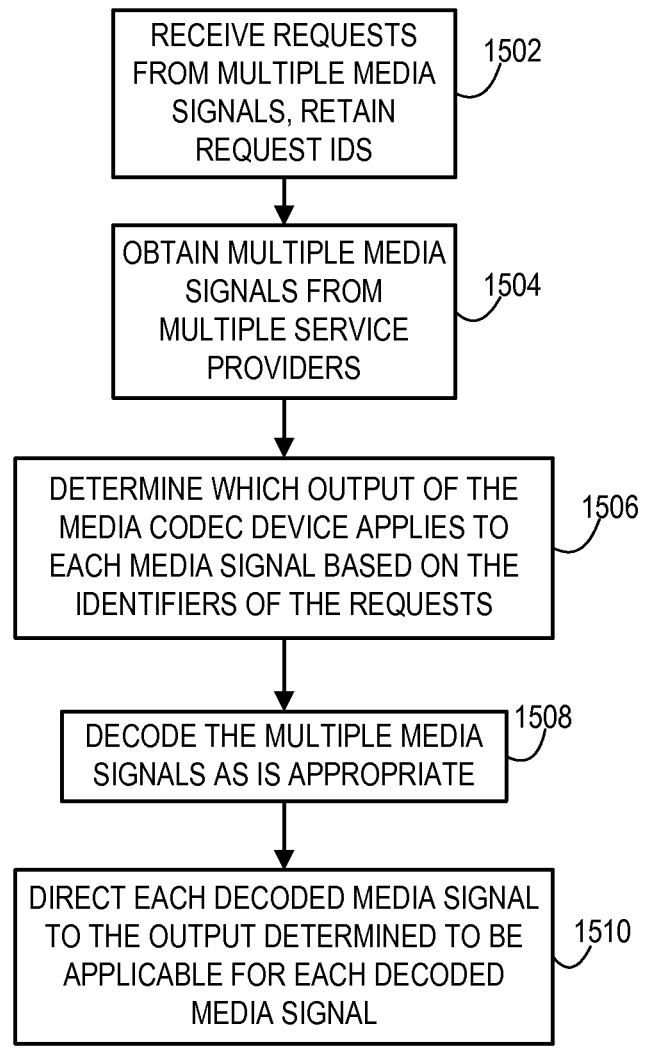
FIG. 15 shows one example of logical operations performed by an illustrative media codec device to distribute multiple media signals to corresponding destinations.

FIG. 15 shows a set of logical operations that may be performed by various embodiments of the media codec device 102 to properly distribute media signals from various service providers or other sources to a variety of playback devices that have requested the media signals. Through implementation of these logical operations, the media codec device 102 acts as a switchboard to ultimately transfer encoded signals from sources in the form of decoded signals to the playback devices. As such, at any point in time, any given playback device of the premise of the user may be providing playback of any given media signal available from any given service provider or other source to which the media codec device 102 has access.

The logical operations begin at a receiving operation 1502 by the media codec device 102 receiving requests for various media signal where the requests have originated from the remote controls 132, 133, and 136 of the premise. The requests include an identification of the requesting remote controls 132, 133, and 136 either as provided by the remote controls 132, 133, and 136 themselves or as provided by the control transmitting units 122, 130 in lieu of IDs from the remotes 132, 133, and 136. The media codec device 102 retains the IDs that accompanied each of the requests in order to map the IDs to outputs and the outputs to the media signals so that the output corresponding to a requesting remote 133 gets the media signal that has been requested by the remote 133, and so on.

The media codec device 102 proceeds to obtain the media signals 138 from each source at a signal operation 1504. As shown in FIG. 15, the media signals 138 may be provided by a collection of service providers. The media signal being requested by the remote 132 may correspond to one service provider, while the media signal being requested by the remote 133 may correspond to a different service provider, and so forth. The media codec device 102 submits upstream communications to the remote media sources 106 or local media sources 110 to negotiate for delivery of the media signals 138, and the media codec device 102 then begins receiving the encoded media signals 138 from the sources 106, 110. In various embodiments, when requesting one or more of the media signals 138, the media codec device 102 may provide credentials to the sources 106, 110 such as a device identifier, an account number, and so forth. In some cases, the sources 106, 110 may not require such credentials but may rely on the security and control of provided by the encoding and encryption of the media signals.

As the media signals are being received, the media codec device 102 may then determine which output of the media codec device 102 applies to each media signal based on the IDs of the request at an ID operation 1506. Here, the media codec device 102 may rely upon the mapping that has been created between the ID and the output that corresponds to the playback device that is paired with the ID. Thus, for the ID of the remote control 133, the media codec device 102 obtains the media signal requested by that ID and then assigns that media signal to the output that is mapped to that ID, which happens to be the output that causes the media transfer unit 114 to distribute media signals on the carrier channel that the playback device 124 is tuned to receive. Thus, by outputting the media signal for the ID of the remote 133 on the output mapped to the ID of the remote 133, the playback device 124 ultimately receives that media signal for playback.

The media codec device 102 proceeds to decode the media signals as appropriate at a decode operation 1508. Here the media signals may be decoded using any decoder keys, decryption algorithms, and codecs as may be appropriate and as discussed above in relation to FIG. 13. Upon decoding the media signals, they are then directed to the respective outputs that are determined to be applicable based on the IDs that have been received when the media signals were requested at an output operation 1510.

FIG. 16 shows one example of a decoder mapping 1600 that may be applied by various embodiments when determining what information to use when decoding various media signals from various sources. For instance, the decoder mapping 1600 may be applied during the logical operations of FIGS. 12-15. In this example, the media codec device 102 has access to four sources including three remote service providers 106 labeled A, B, and C and one local source 110 labeled Local-1 as shown in a service provider column 1602.

Each of the available sources of column 1602 has a collection of media channels that are available to the media codec device 102 and are set forth in a column 1604. These media channels may correspond to live feed channels, such as those from CBS Broadcasting, Inc. (CBS) or from the National Broadcasting Company (NBC), as well as on-demand media content that is available and assigned to a given channel, such as a particular episode of a show from CBS or NBC.

As shown, service provider A has channels 1-20 that are available to the media codec device 102, while service provider B has channels 1-10, and service provider C has channels 35-50. Any number of those may be live feed channels versus on-demand media content assigned to given channels. A local source Local-1 provides a single channel which also may either be a live feed, such as from a security camera, or an on-demand channel such as from a digital video recorder.

decoder mapping 1606 may also map decoder information such as an applicable decoder key shown in a column 1606 to each service provider and even to each channel. In the examples shown, service provider A utilizes the same decoder key, labeled <1A>, for each channel. Service provider B utilizes a different decoder key for each channel, ranging from <1B> to <10B>. Service provider C utilizes the same decoder key for one set of channels, labeled <35C>, and a second decoder key for a second set of channels, labeled <40C>. The local resource Local-1 utilizes a decoder key labeled <1L-1>.

When a user requests a particular media signal, that request identifies the service provider, if more than one is providing media services to the media codec device 102, as well as the channel of content. In some embodiments, the processor of the media codec device 102 may provide that information to the decoder chip, where this decoder mapping 1600 is maintained in decoder chip memory. The decoder chip then finds and applies the appropriate decoding information to achieve a decoded media signal. As one alternative, the processor of the media codec device 102 may maintain this decoder mapping 1600 in its operating memory and may obtain the labels of the appropriate decoder information from this decoder mapping 1600. The processor may provide those labels to the decoder chip that may then apply the decoder information corresponding to the labels to the encoded media signal to achieve the decoded media signal.

Figure 17:
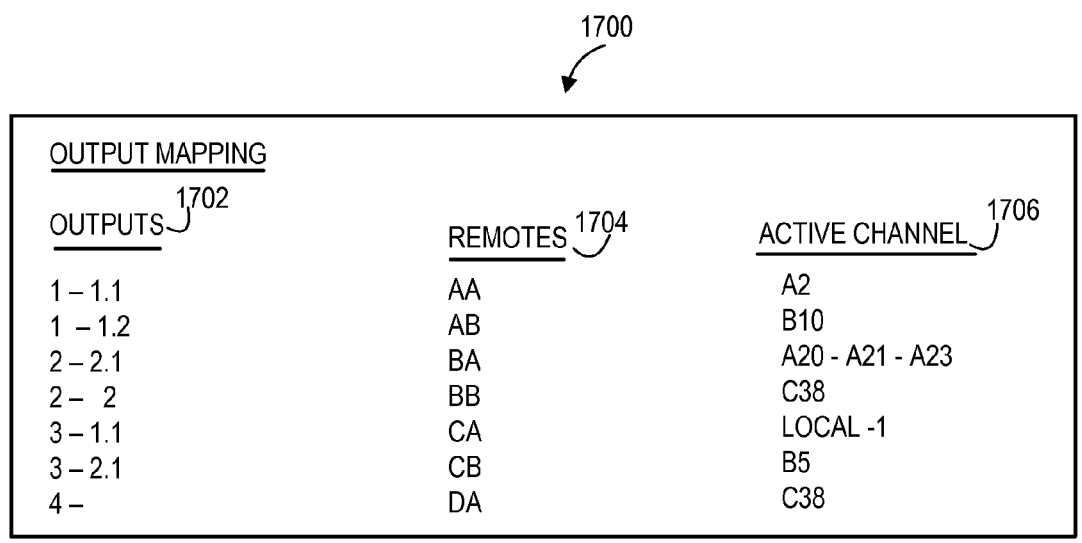
FIG. 17 shows one example of a mapping of a current media signal distribution scheme within a memory of an illustrative media codec device.

FIG. 17 shows an example of an output mapping 1700 that may be maintained in the operating memory of the media codec device 102 that is used to correctly distribute media signals that have been requested. A first column 1702 lists the outputs that are active. A second column 1704 lists the IDs of the remote controls, or the stand-in IDs for the remote controls, that are mapped to the outputs. A third column 1706 lists the active channels that are mapped to the IDs and thus to the outputs.

In the example shown, a first output 1-1.1 may correspond to the media transfer unit 114 that is localcasting or injecting on ATSC channel 1.1 and where the playback device 124 that is in proximity to a remote control 133 whose identifier is AA is tuned to channel 1.1. Thus, the active channel A2 is being sent on output 1-1.1 which results in the playback device 124 showing the media signal of channel A2 which has been requested by the remote 133.

A second output 1-1.2 may correspond to the media transfer unit 114 that is localcasting or injecting on ATSC channel 1.2 and where the playback device 128 that is in proximity to the remote control 132 whose identifier is AB is tuned to channel 1.2. Thus, the active channel B10 is being sent on output 1-1.2 which results in the playback device 128 showing the media signal of channel B 10 which has been requested by the remote 132.

One can see that this continues for the other outputs, remotes, and active channels. As is further shown in FIG. 17, a second media transfer unit transmits media content of multiple channels A20, A21, and A23 on ATSC channel 2.1 while also transmitting media content of channel C38 on NTSC channel 2. Thus, one display device that is assigned to ATSC channel 2.1 is showing a mix of three media signals from channels A20, A21, and A23. Providing a mix of multiple media signals is discussed in more detail below with reference to FIGS. 22 and 23.

Also shown in FIG. 17, a third media transfer unit localcasts or injects onto ATSC channel 1.1. Considering that both the first media transfer unit 114 and the third media transfer unit are sending media signals on ATSC channel 1.1, then the third media transfer unit is injecting if the first media transfer unit 114 is localcasting or the third media transfer unit is localcasting if the first media transfer unit 114 is injecting so as to avoid providing two different media signals on the same ATSC channel on the same distribution medium.

A fourth output is not related to any particular carrier channel as it may be a direct connection to the playback device 134, such as via an HDMI or DVI-D connection. In this example, the corresponding remote control 136 has an ID of DA and the fourth output provides the media signal of channel C38. Thus, it can be seen in this example that two different remotes have requested channel C38, where one is delivered directly to playback device 134 from the media codec device 102 while another is delivered by a media transfer unit 116 on NTSC channel 2 to the playback device 128.

Figure 18:
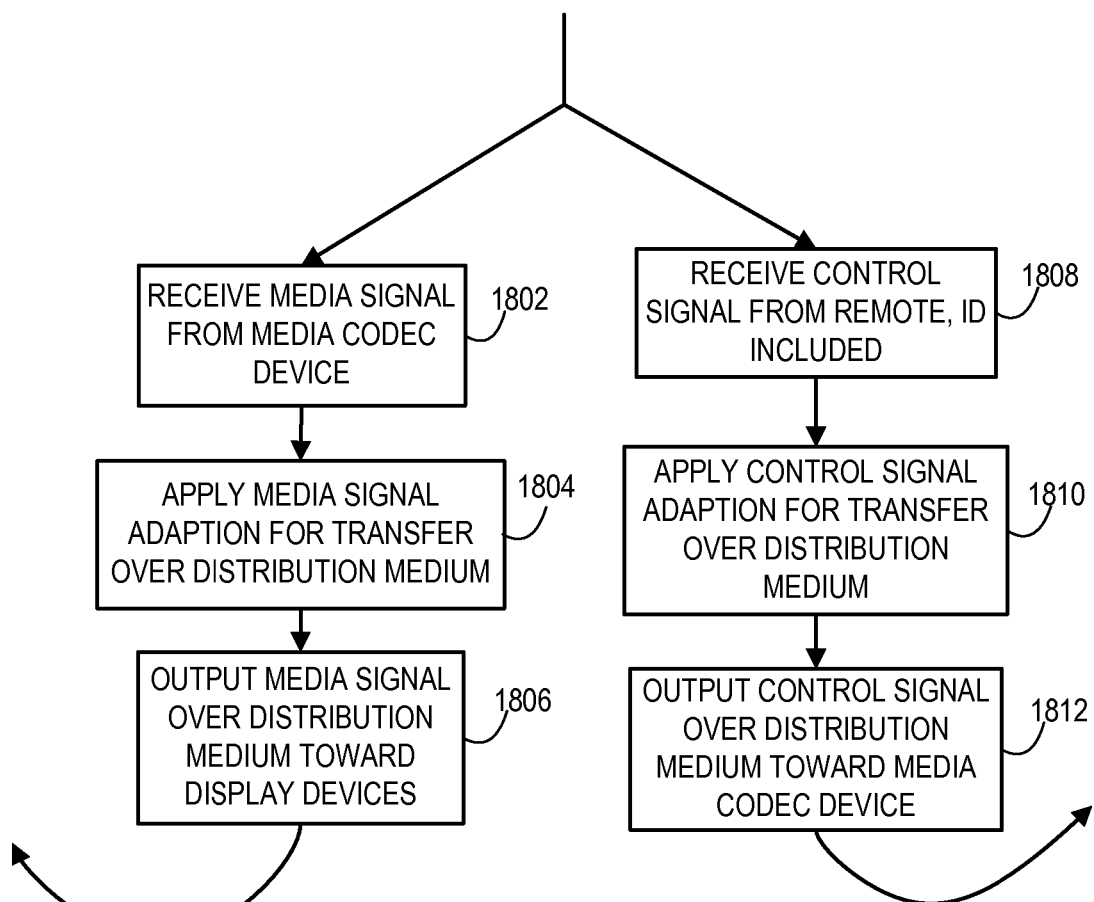
FIG. 18 shows one example of logical operations performed in parallel by an illustrative media transfer unit and a control transmitter unit.

FIG. 18 shows an example of logical operations that may be performed in parallel between a media transfer unit, such as the media transfer unit 114, and a control transmitting unit, such as the control transmitting unit 122, where both utilize the same distribution medium for signal transfer. The media transfer unit 114 may receive a media signal from the media codec device 102 at a signal operation 1802 where that media signal is to be distributed over a distribution medium such as a coaxial cable, telephone line, network line, or power line. The media transfer unit 114 applies adaption of the media signal to a format suitable for transmission, such as by converting the data into a modulated carrier wave on a given channel at adaption operation 1804. Thereafter, the media transfer unit 114 outputs the media signal over the distribution medium toward the playback devices 124 at an output operation 1806.

Contemporaneously with those operations of the media transfer unit 114, the control transmitting unit 122 may receive a control signal from a remote control 133 at a signal operation 1808. That control signal is to be transferred over a distribution medium such as a coaxial cable, telephone line, network line, or power line back to the control receiving unit 112. According to some embodiments, the distribution medium being used by the control transmitting unit 122 may be the same distribution medium being used by the media transfer unit 114, and like the example shown in FIG. 11, the control transmitting unit 122 may be in-line and pass through the media signals to the playback device 124.

The control transmitting unit 122 applies adaption of the control signal to a format suitable for transmission, such as by converting the control data into a modulated carrier wave on a given channel at adaption operation 1810. Thereafter, the control transmitting unit 122 outputs the control signal over the distribution medium toward the control receiving unit 112 at an output operation 1812.

From FIG. 18, it can be seen that the transfer of media signals and control signals may occur contemporaneously. It can further be seen from FIG. 18 that such contemporaneous transfer may occur over the same distribution medium. In doing so, the setup of the media services at the user premise may be simplified and may limit the extent to which existing resources of the user premise are impacted.

Figure 19:
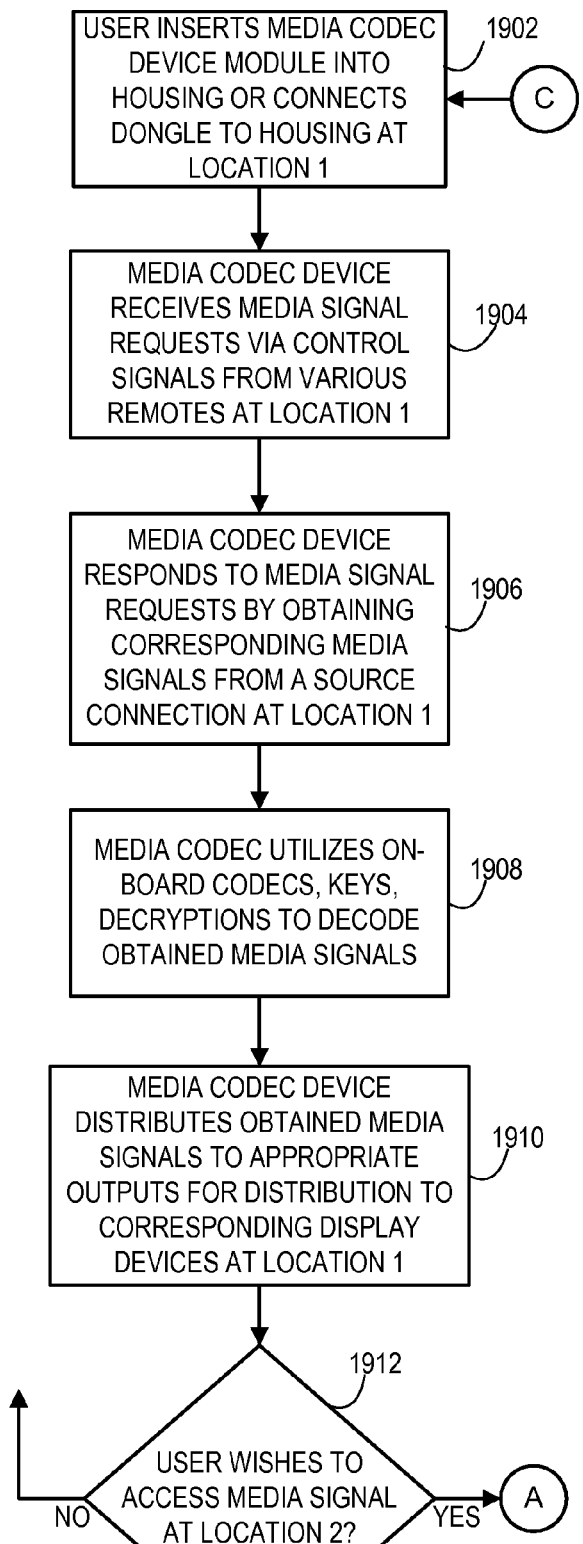
FIGS. 19-21 show one example of logical operations performed by a user and an illustrative media codec device to transport media services provided by the media codec device between physical locations.

FIG. 19 shows one example of a set of logical operations that may be performed by the user in conjunction with the media codec device 102 in order to provision media services at two different locations. Initially, the user may wish to enjoy media services at a first location. The user inserts the media codec device 102 into a plug-in slot or port of a housing that supports the connectivity to peripherals of the first location or otherwise connects the peripherals via dongles or other cabling at a connection operation 1902.

The media codec device 102 becomes operational upon being connected and then receives the requests for media signals via control signals from various remote controls at the first location at a request operation 1904. The media codec device 102 responds to the requests by obtaining the corresponding media signals from the service providers and other sources available to the media codec device 102 including those sources that are local to this first location at a signal operation 1906. The media codec device 102 then decodes the obtained media signals utilizing its on-board decoder keys, decryption algorithms, and codecs at a decode operation 1908. The media codec device 102 then distributes the decoded media signals to the appropriate outputs for distribution by media transfer units present at this first location at a distribution operation 1910. The media signals are ultimately delivered to playback devices located at this first location.

At a query operation 1912, the user decides whether to access the media services at a second location. If not, then the preceding operations of the media codec device 102 continue at the first location so that media services continue to be available to the user at the first location. When the user decides to access media services at a second location, then rather than having a second subscription to the media services for a separate media codec device at the second location, the user may instead use the media codec device 102 that is currently operational at the first location at the second location.

Figure 20:
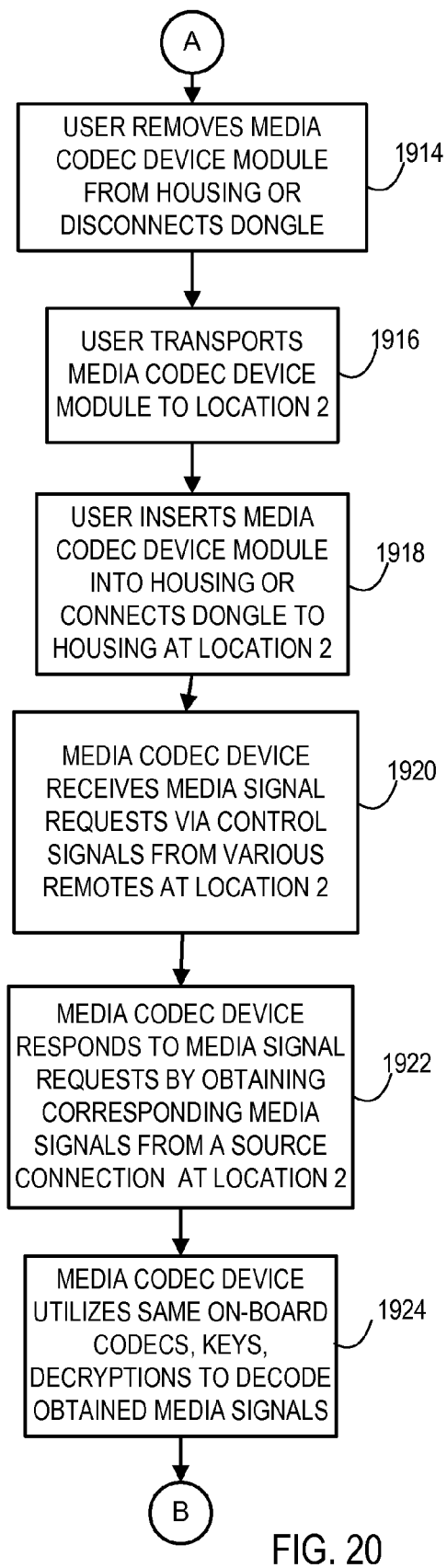

As shown in FIG. 20, the user removes the media codec device 102 from the plug-in port of slot of the housing at the first location, or disconnects the one or more dongles at a disconnect operation 1914. The user then transports the media codec device 102 to the second location at a transport operation 1916. As various embodiments of the media codec device 102 may have a relatively small form factor, particularly due to the absence of on-board distribution peripherals and/or power components, transporting the media codec device 102 may be a minimal task.

At the second location, the user inserts the media codec device 102 into a plug-in slot or port of a housing that supports the connectivity to peripherals of the second location or otherwise connects the peripherals via dongles or other cabling at a connection operation 1918.

Figure 21:
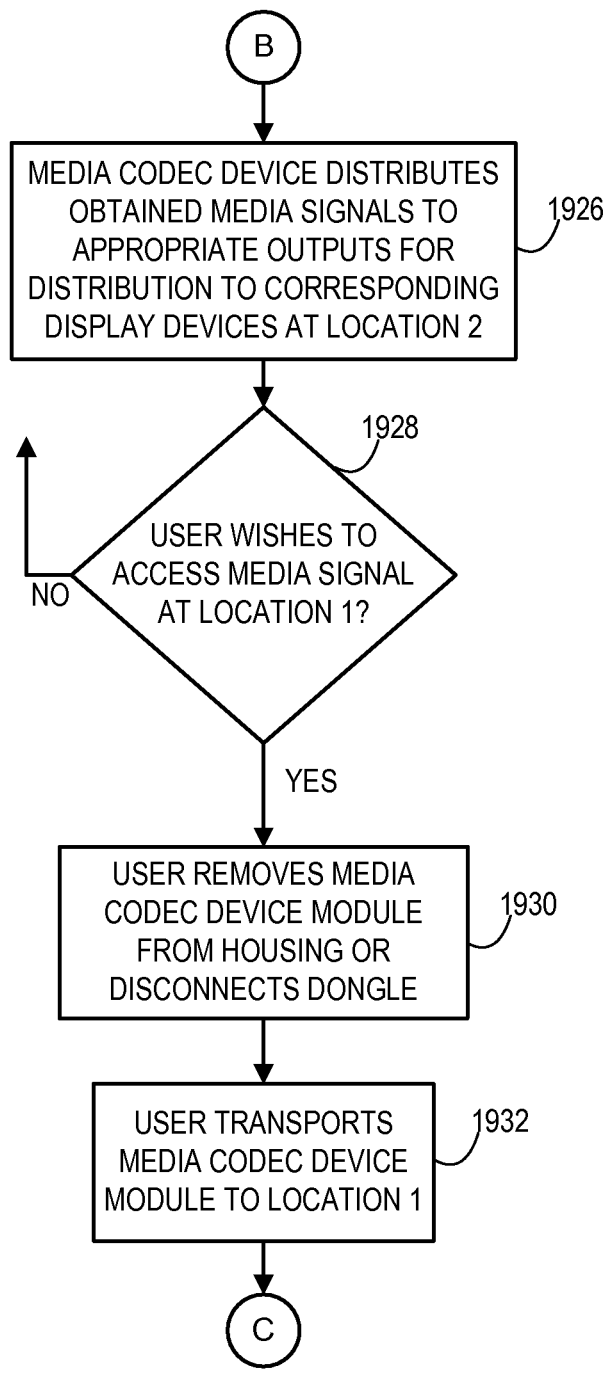

The media codec device 102 becomes operational upon being connected and then receives the requests for media signals via control signals from various remote controls at the second location at a request operation 1920. The media codec device 102 responds to the requests by obtaining the corresponding media signals from the same service providers and other sources available to the media codec device 102 including those sources that are local to this second location at a signal operation 1922. The media codec device 102 then decodes the obtained media signals utilizing its same on-board decoder keys, decryption algorithms, and codecs at a decode operation 1924. The media codec device 102 then distributes the decoded media signals to the appropriate outputs for distribution by media transfer units present at this second location at an output operation 1926 of FIG. 21. The media signals are ultimately delivered to playback devices located at this second location.

Thus, the user may enjoy the same media services at the second location that were being enjoyed at the first location. However, the media transfer units, control transmitting units, control receiving units, media display units, and playback devices may be entirely different devices than those of the first location. For instance, the first location may utilize localcasting of media signals and RF transmission of control signals while the second location may utilize coax or other cable injection of media signals and control signals. Various embodiments of the media codec device 102 merely establish a new output mapping of outputs to remotes and to active channels as shown in FIG. 17 while continuing to use the same decoder mapping as shown in FIG. 16 except as modified for the change in local sources.

At a query operation 1928, the user decides whether to access the media services at the first or any other location. If not, then the preceding operations of the media codec device 102 continue at the second location so that media services continue to be available to the user at the second location. When the user decides to access media services at the first or any other location, then the user removes the media codec device 102 from the plug-in port of slot of the housing at the second location, or disconnects the one or more dongles at a disconnect operation 1930. The user then transports the media codec device 102 to the first or other location at a transport operation 1932, and then the operational flow proceeds as discussed above at the connection operation 1902.

Figure 22:
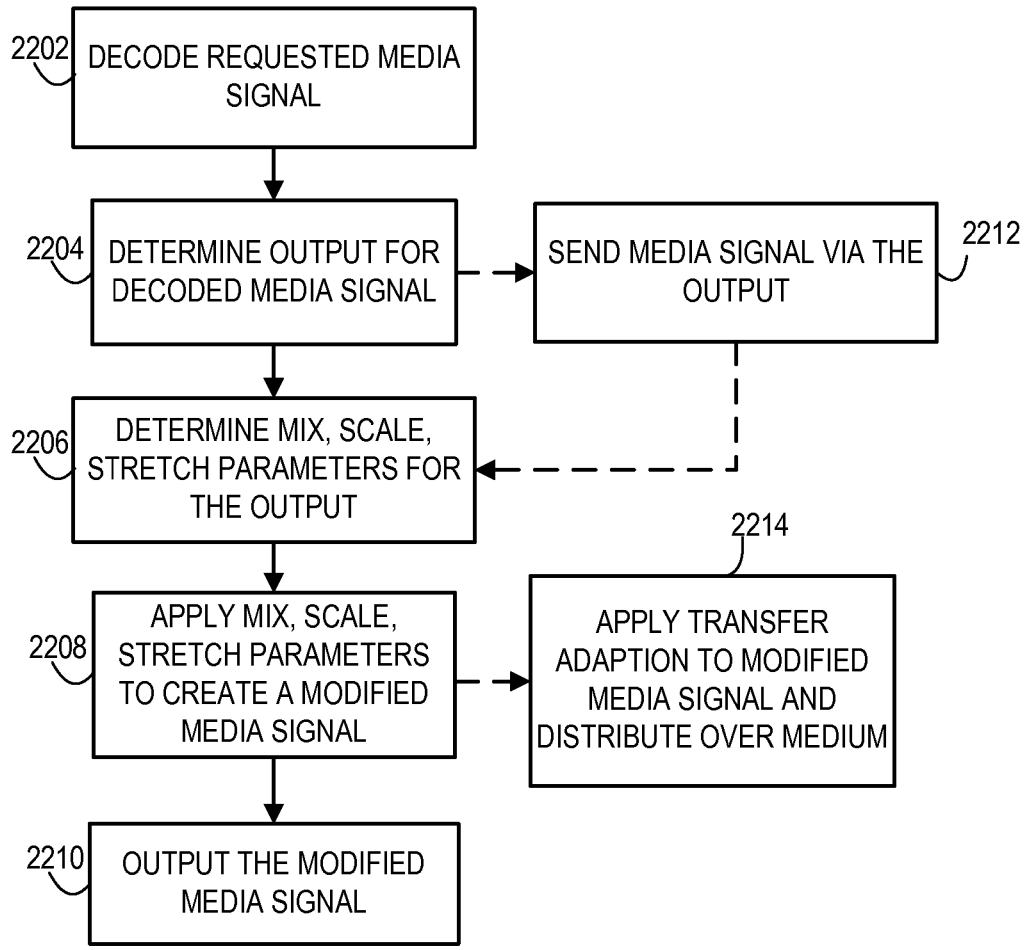
FIG. 22 shows one example of logical operations performed by an illustrative media codec device alone, or in conjunction with an illustrative media transfer unit, to manipulate media signals for distribution.

FIG. 22 shows an example of logical operations that may be performed by the media codec device 102, or by the media codec device 102 in conjunction with the media transfer unit 114 and/or media display unit 126, to manipulate media signals as may be desired by a user. Initially, a given media signal is decoded at a decode operation 2202 and then the appropriate output for the decoded media signal is determined such as by reference to the output mapping at a detection operation 2204.

At this point, according to various embodiments the media signal may either be manipulated by the media codec device 102 or may be manipulated by a media transfer unit 114 or a media display unit 126 that may possess manipulation capabilities. For embodiments where the media codec device 102 performs the manipulation, then operational flow proceeds to a detection operation 2206. For embodiments where the media transfer unit 114 or media display unit 126 perform the manipulation, then operational flow proceeds to an output operation 2212 where the media signal is output by the media codec device to the media transfer unit 114 and/or media display unit 126.

At the detection operation 2206, the media codec device 102, media transfer unit 114, or media display unit 126 determine what the manipulation should be, if anything. A manipulation may be requested by the user via control signals in order to mix multiple media signals into a combined media signal to create a picture-by-picture, picture-in-picture, or picture-out-of-picture effect. Another manipulation may be requested in order to scale the resolution of the native media signal up or down, such as to improve the appearance of the media signal when displayed by a given playback device 124 having display characteristics that may be better suited to a manipulated media signal than a native one. Yet another manipulation may be requested by the user to stretch the media signal to a different aspect ratio than the native signal provides, such as to stretch a 4:3 signal to fill a 16:9 screen horizontally or to stretch a 16:9 signal to fill a 4:3 screen vertically. Various other manipulations may also be available.

Such manipulations are applied to the media signal(s) at a modification operation 2208 to produce a modified media signal. For embodiments where the media codec device 102 has produced the modified media signal, then the media codec device 102 outputs the modified media signal to the appropriate output at an output operation 2210. For embodiments where the media transfer unit 114 or media display unit 126 produce the modified media signal, then the applicable adaption for transfer is applied to the modified media signal for further distribution to the playback device 124, 128 at an adaption operation 2214.

FIG. 23 shows an example of an output modification mapping 2300 that may be maintained in operating memory of the media codec device 102. A similar modification mapping may instead be maintained in operating memory of the media transfer unit 114 or the media display unit 126 for embodiments where those devices perform the media signal manipulation rather than the media codec device 102.

A first column 2302 lists the outputs currently in use. A second column 2304 lists whether a stretch is to be performed on the media signal of the corresponding output. A third column 2306 lists whether a scaling of the resolution should be performed on the media signal of the corresponding output. A fourth column 2308 lists whether multiple media signals are mixed into a combined media signal for the corresponding output.

In the example shown in FIG. 23, the media signal of every output is receiving some form of manipulation except the media signal of output 4. The output 2-2.1, which corresponds to a second media transfer unit using an ATSC channel 2.1 for distribution, is providing a mix of multiple media signals. This corresponds with the output mapping of FIG. 17, where multiple active channels are mapped to the output 2-2.1. Thus, those multiple active channels are getting mixed into a combined media signal for distribution to a playback device.

To the extent the manipulation is occurring at the media transfer unit 114 or media display unit 126, the output mapping 2300 may be confined to just those outputs of the media transfer unit 114 or media display unit 126. For instance, the media transfer unit corresponding to outputs 1-1.1 and 1-1.2 would maintain the mapping for those two outputs and not for outputs of other media transfer units.

When the media codec device 102 or the media display unit 126 are directly connected to a playback device, such as the playback devices 124, 134, via a bi-directional data connection such as with HDMI or with VGA, the playback device 124, 134 may communicate its abilities and/or any manipulation requests to the media codec device 102 or media display unit 126. For instance, a VGA monitor may communicate over a Display Data Channel (DDC) the Extended Display Identification Data (EDID). In turn, the media codec device 102 or media display unit 126 may be responsive to such information to apply a manipulation of the media signal, such as to scale the media signal to the resolution that the VGA monitor is capable of displaying in a full screen.

The various embodiments of media codec devices, related peripherals, and logical operations illustrate that media services may be provided to consumers in a variety of manners. These various embodiments further illustrate that media services may be handled by a single media codec device for a given premise, that a single media codec device may handle multiple media signals from multiple sources and control the distribution of the media signals to corresponding playback devices, and that a given media codec device may be used in multiple locations to provide the media services wherever the consumer may be.

While embodiments have been particularly shown and described, it will be understood by those skilled in the art that various other changes in the form and details may be made therein without departing from the spirit and scope of the invention.

What is claimed is:

1. A media codec device, comprising:
   an input port that receives a first media signal from a first service provider and a second media signal from a second service provider, wherein the input port also receives power for the media codec device, and wherein the first and second media signals are protected and encoded; and
   a hardware based decoder including a memory that stores a first decoder key associated with the first service provider and a second decoder key associated with the second service provider, wherein the hardware based decoder applies the first decoder key to decode the first media signal and the second decoder key to decode the second media signal, wherein:
      the memory stores a third decoder key associated with a third service provider;
      the input port receives a key removal signal; and
      the hardware based decoder decodes the key removal signal with the third decoder key, wherein the decoded key removal signal provides an instruction to the media codec device to remove the third decoder key; and
   wherein:
      the media codec device performs operations comprising:
         directing at a first time the decoded first media signal to a first output device and the decoded second media signal to a second output device;
         directing at a second time the decoded first media signal to the second output device and the decoded second media signal to the first output device; and
         removing the third decoder key from the memory in response to the instruction.

2. The media codec device of claim 1, wherein further:
   the memory stores a service activation key associated with a third service provider;
   the input port receives a protected key signal; and
   the hardware based decoder decodes the protected key signal with the service activation key to provide a third decoder key associated with the third service provider, and stores the third decoder key in the memory for subsequent use when decoding a third media signal from the third service provider.

3. The media codec device of claim 1, wherein the operations further comprise scaling the decoded first media signal to a resolution appropriate for a display device that receives the decoded first media signal.

4. The media codec device of claim 1, further comprising:
   a control input;
   wherein directing the decoded first media signal to the first output device and the decoded second media signal to the second output device is in response to a control input signal received at the control input.

5. The media codec device of claim 4, wherein:
   the control input signal originates from a remote control associated with a display device, the remote control having an identifier that is logically bound at the media codec device via a corresponding media transfer unit connected to an output connection of the media codec device; and
   the remote control identifier is included in the control input signal.

6. The media codec device of claim 1, wherein the operations further comprise:
   combining at a third time the decoded first media signal and the decoded second media signal into composite media signal; and a second output device; and
   directing the composite media signal to a third output device.

7. A method of providing media services, comprising:
   receiving power for a media codec device at an input of the media codec device, the power being received from a first host device;
   receiving, at a hardware based decoder of the media codec device, a first decoder key associated with a service provider, wherein the first decoder key is received via the input from the first host device;
   storing the first decoder key within a modifiable memory of the media codec device;
   receiving a first media signal at the media codec device from the service provider, wherein the first media signal is received via the input from the first host device;
   decoding the first media signal at the media codec device using the decoder and the first decoder key;
   uncoupling the media codec device from the first host device;
   receiving power for the media codec device at the input, the power being received from a second host device;
   receiving a second media signal at the media codec device from the service provider, wherein the second media signal is received via the input from the second host;
   decoding the second media signal at the media codec device using the decoder and the first decoder key;
   receiving a key removal signal at the media codec device;
   decoding the key removal signal at the media codec device using the decoder and the first decoder key, the decoded key removal signal providing an instruction to the media codec device to remove the first decoder key; and
   removing the first decoder associated from the memory in response to executing the instruction.

8. The method of claim 7, wherein the memory includes an activation key associated with a service, the method further comprising:
   receiving an activation key signal at the media codec device;
   decoding the activation key signal using the decoder and the activation key, the activation key signal providing a second decoder key associated with the service; and
   storing the second decoder key in the memory for subsequent use when decoding a third media signal associated with the service.

9. The method of claim 7, further comprising:
   directing the decoded first media signal to a display device by outputting the decoded first media signal to a media transport unit that transfers the media signal to the display device.

10. The method of claim 7, further comprising:
    scaling the decoded first media signal to a resolution appropriate for a display device that receives the decoded first media signal.

11. The method of claim 7, further comprising:
receiving a control signal at control input of the media codec device, the control signal requesting a third media signal and identifying a display device;
obtaining and decoding the third media signal at the media codec device; and
directing the decoded third media signal to a media transfer unit capable associated with the display device.

12. The method of claim 7, further comprising:
coupling the media codec device to a first housing at a first location that provides connectivity to a first media transfer unit;
removing the media codec device from the first housing; and
coupling the media codec device to a second housing at a second location that provides connectivity to a second media transfer unit.

13. A media codec device including a processor to execute code and a memory including code for causing the processor to perform operations, the operations comprising:
receiving power for the media codec device at an input of the media codec device, the power being received from a first host device;
receiving at a hardware based decoder of the media codec device a first decoder key associated with a service provider, wherein the first decoder key is received via the input from the first host device;
storing the first decoder key within the memory;
receiving a first media signal at the media codec device from the service provider, wherein the first media signal is received via the input from the first host device;
decoding the first media signal at the media codec device using the decoder and the first decoder key;
uncoupling the media codec device from the first host device;
receiving power for the media codec device at the input, the power being received from a second host device;
receiving a second media signal at the media codec device from the service provider, wherein the second media signal is received via the input from the second host;
decoding the second media signal at the media codec device using the decoder and the first decoder key;
receiving a key removal signal at the media codec device;
decoding the key removal signal at the media codec device using the decoder and the first decoder key, the decoded key removal signal providing an instruction to the media codec device to remove the first decoder key; and
removing the first decoder associated from the memory in response to executing the instruction.

14. The media codec device of claim 13, wherein the memory includes an activation key associated with a service, the operations further comprising:
receiving an activation key signal at the media codec device;
decoding the activation key signal using the decoder and the activation key, the activation key signal providing a second decoder key associated with the service; and
storing the second decoder key in the memory for subsequent use when decoding a third media signal associated with the service.

15. The media codec device of claim 13, the operations further comprising:
directing the decoded first media signal to a display device by outputting the decoded first media signal to a media transport unit that transfers the media signal to the display device.

16. The media codec device of claim 13, the operations further comprising:
scaling the decoded first media signal to a resolution appropriate for a display device that receives the decoded first media signal.

17. The media codec device of claim 13, the operations further comprising:
receiving a control signal at control input of the media codec device, the control signal requesting a third media signal and identifying a display device;
obtaining and decoding the third media signal at the media codec device; and
directing the decoded third media signal to a media transfer unit capable associated with the display device.

* * * * *